United States Patent
Sapak et al.

(10) Patent No.: US 12,163,677 B2
(45) Date of Patent: Dec. 10, 2024

(54) DETECTION OF HVAC EQUIPMENT WIRED TO A THERMOSTAT

(71) Applicant: Ademco Inc., Golden Valley, MN (US)

(72) Inventors: Jiri Sapak, Brno (CZ); Mohammad A. Aljabari, Brooklyn Park, MN (US); David Mulhouse, Minnetonka, MN (US); Daniel Becvar, Brno (CZ); Tracy Lentz, Minneapolis, MN (US); Liliana Reategui, Saint Anthony, MN (US); Anuj Kohli, Apple Valley, MN (US)

(73) Assignee: Ademco Inc., Golden Valley, MN (US)

( * ) Notice: Subject to any disclaimer, the term of this patent is extended or adjusted under 35 U.S.C. 154(b) by 96 days.

(21) Appl. No.: 16/719,428

(22) Filed: Dec. 18, 2019

(65) Prior Publication Data

US 2021/0190348 A1    Jun. 24, 2021

(51) Int. Cl.
*F24F 11/30*    (2018.01)
*H02M 7/06*    (2006.01)

(52) U.S. Cl.
CPC ............... *F24F 11/30* (2018.01); *H02M 7/06* (2013.01)

(58) Field of Classification Search
CPC ............ F24F 11/30; F24F 11/88; F24F 11/89; F24F 11/38; H02M 7/06
See application file for complete search history.

(56) References Cited

U.S. PATENT DOCUMENTS

| | | | | |
|---|---|---|---|---|
| 4,328,528 A | * | 5/1982 | Kompelien | G05D 23/1904 361/211 |
| 4,362,133 A | * | 12/1982 | Malik | F16D 48/08 123/179.5 |
| 8,757,507 B2 | | 6/2014 | Fadell et al. | |
| 8,861,743 B2 | * | 10/2014 | Pantfoerder | H04R 1/1041 381/74 |
| 2007/0221741 A1 | | 9/2007 | Wagner et al. | |

(Continued)

FOREIGN PATENT DOCUMENTS

| | | |
|---|---|---|
| EP | 3240972 | 11/2017 |
| JP | S5482051 A * | 6/1979 |

OTHER PUBLICATIONS

Miyamoto, Smooth Start Circuit for Switching Regulators, Jun. 29, 1979, JPS5482051A, Whole Document (Year: 1979).*

(Continued)

*Primary Examiner* — Larry L Furdge
(74) *Attorney, Agent, or Firm* — Greenberg Traurig, LLP; David J. Dykeman; Ryan D. Sharp

(57) ABSTRACT

A system for detection of equipment connections to a thermostat. The thermostat has one or more terminals with a one-to-one connection to one or more loads respectively of heating, ventilation and/or air conditioning equipment, and one or more terminals with a one-to-one connection to electrical power. One or more detectors are connected one-to-one to each of the one or more terminals, respectively, for connection to the one or more loads, and the one or more connections to the electrical power. Each detector is connected to a processor. Each detector is configured to provide a signal to the processor relative to a corresponding terminal indicating a status of a connection of the terminal to a load or to the electrical power.

18 Claims, 24 Drawing Sheets

(56) References Cited

U.S. PATENT DOCUMENTS

| | | | | |
|---|---|---|---|---|
| 2013/0218351 | A1* | 8/2013 | Warren | F24F 11/62 |
| | | | | 700/278 |
| 2014/0084072 | A1* | 3/2014 | Conner | G05D 23/1919 |
| | | | | 236/1 C |
| 2014/0253091 | A1* | 9/2014 | Ishihara | G01R 19/2513 |
| | | | | 324/66 |
| 2018/0136677 | A1* | 5/2018 | Marschalkowski | H02H 3/08 |
| 2018/0283716 | A1* | 10/2018 | Ribbich | G05D 23/1902 |
| 2019/0056131 | A1* | 2/2019 | Warren | F24F 11/89 |

OTHER PUBLICATIONS

"ECOBEE, Frequently Asked Questions," accessed from http://www.myrec.coop/res/save-energy/ecobee-frequently-asked-questions.cfm on or about Apr. 20, 2018, 9 pp.

"Using Interrupts With Peripherals," Renesas Electronics America Inc., Embedded Systems using the RX63N, Chapter 9, Rev. 1.0, 2014, Retrieved from the Internet: URL: https://webpages.charlotte.edu/~jmconrad/ECGR4101-2015-08/Notes/Renesas_RX63N_Chapter09_Slides_Ver1.0.pdf, 32 pp. (Applicant points out, in accordance with MPEP 609.04(a), that the year of publication, 2014, is sufficiently earlier than the effective U.S. filing date, so that the particular month of publication is not in issue).

"Application Note—Setting Interrupts with the eZ80® CPU," ZiLOG Worldwide Headquarters, AN017001-0903, Retrieved from the Internet: URL: http://www.zilog.com/docs/appnotes/an0170.pdf, 21 pp. (Applicant points out, in accordance with MPEP 609.04(a), that the year of publication, 2003, is sufficiently earlier than the effective U.S. filing date, so that the particular month of publication is not in issue).

"Tutorial 14: Non-Maskable Interrupts," ESIEE, Accessed: Mar. 7, 2022, Retrieved from the Internet: URL: https://view.officeapps.live.com/op/view.aspx?src=https%3A%2F%2Fperso.esiee.fr%2F~baudoing%2FCD%2FTutorial%2FSelf-study%2FAssembly%2520Language%2520Tutorial%252014%2FTutorial14.doc&wdOrigin=BROWSELINK, 12 pp.

* cited by examiner

FIG. 7A — Single transformer configuration (or dual in-phase transformer configuration) — 75

| | Terminal --> | RC | RH | Y | Y2 | G | W-O/B | W2-AUX | E |
|---|---|---|---|---|---|---|---|---|---|
| After power up, OFF state | Wired load? | | | ✓ | ✓ | ✗ | ✓ | ✓ | ✓ |
| | Energized load? | | | ✗ | ✗ | ✗ | ✗ | ✗ | ✗ |
| | Detected pulses phase: | 0° | 0° | 180° | 180° | No signal | 180° | 180° | 180° |
| | Interpretation: | REF | In-phase windings | Wired | Wired | Not wired | Wired | Wired | Wired |
| Later (Call for Heat) | Wired load? | | | ✓ | ✓ | ✗ | ✓ | ✗ | ✓ |
| | Energized load? | | | ✓ | ✗ | ✓ | ✓ | ✗ | ✗ |
| | Detected pulses phase: | 0° | 0° | 0° | 180° | 0° | 0° | No signal | 180° |
| | Interpretation: | REF | In-phase windings | Energized | Wired | Energized | Energized | Unreliable wiring or TACO | Wired |

FIG. 7B — Dual transformer configuration, heat transformer with REVERSED winding orientation — 76

| | Terminal --> | RC | RH | Y | Y2 | G | W-O/B | W2-AUX | E |
|---|---|---|---|---|---|---|---|---|---|
| After power up, OFF state | Wired load? | | | ✓ | ✓ | ✗ | ✓ | ✓ | ✓ |
| | Energized load? | | | ✗ | ✗ | ✗ | ✗ | ✗ | ✗ |
| | Detected pulses phase: | 0° | 180° | 180° | 180° | No signal | 180° | 180° | 180° |
| | Interpretation: | REF | Reversed winding | Wired | Wired | Not wired | Wired | Wired | Wired |
| Later (Call for Heat) | Wired load? | | | ✓ | ✓ | ✗ | ✓ | ✗ | ✓ |
| | Energized load? | | | ✓ | ✗ | ✓ | ✓ | ✗ | ✗ |
| | Detected pulses phase: | 0° | 180° | 0° | 180° | 0° | 180° (*) | No signal | 180° |
| | Interpretation: | REF | Reversed winding | Wired | Wired | Not wired | Wired | Unreliable wiring or TACO | Wired |

(*) If one of the transformers has reversed winding orientation, detected phase is same not only in an OFF state but also in an energized state (for loads powered from RH)

| Dual transformer configuration, R wire from transformer accidentally miss-wired to a W-O/B terminal | | | | | | | | |
|---|---|---|---|---|---|---|---|---|
| Terminal --> | | RC | RH | Y | Y2 | G | W-O/B | W2-AUX | E |
| | Wired load? | | | ✓ | ✓ | ✗ | ✓ | ✓ | ✓ |
| After power up, OFF state | Energized load? | | | ✗ | ✗ | ✗ | ✗ | ✗ | ✗ |
| | Detected pulses phase: | 0° | No signal | 180° | 180° | No signal | 0° | 180° | 180° |
| | Interpretation: | REF | Not wired RH or C | Wired | Wired | Not wired | Miss-wiring! | Wired | Wired |

FIG. 7C

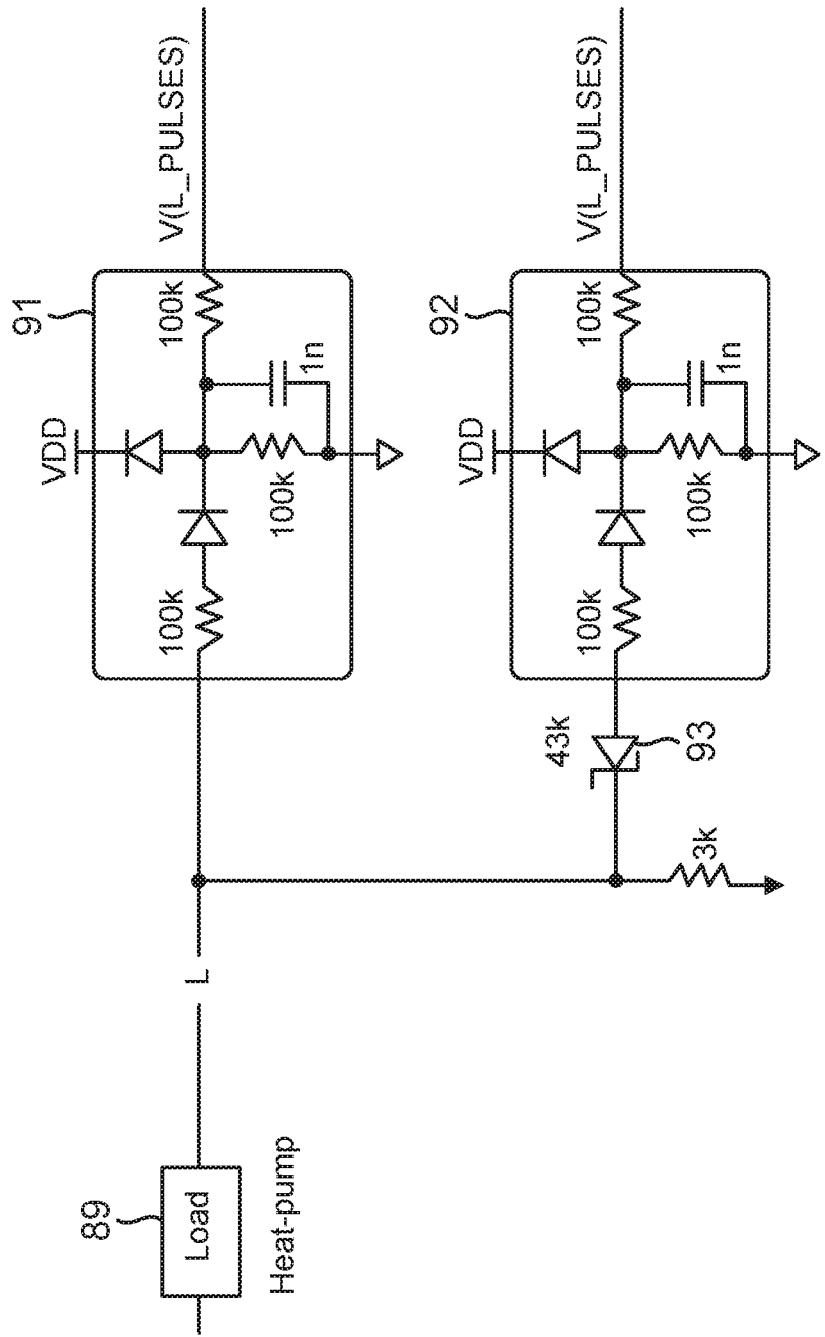

DETECTION OF HVAC EQUIPMENT WIRED TO A THERMOSTAT

BACKGROUND

The present disclosure pertains to detection of connections or non-connection of components and particularly to connections of loads such as those of equipment associated with heating and cooling.

SUMMARY

The disclosure describes a system for detection of equipment connections to a thermostat. The thermostat may have one or more terminals with a one-to-one connection to one or more loads respectively of heating, ventilation and/or air conditioning equipment, and one or more terminals with a one-to-one connection to electrical power. One or more detectors may be connected one-to-one to each of the one or more terminals, respectively, for connection to the one or more loads, and the one or more connections to the electrical power. Each detector may be connected to a processor. Each detector may be configured to provide a signal to the processor relative to a corresponding terminal indicating a status of a connection of the terminal to a load or to the electrical power.

BRIEF DESCRIPTION OF THE DRAWING

FIG. 7A is a table of check-offs for a thermostat having a single transformer configuration or a dual in phase transformer configuration;

FIG. 7B is a table similar to the table of FIG. 7A except that the check-offs may be for a dual transformer configuration heat transformer with a reversed winding orientation;

FIG. 7C is a table asking questions like those for tables of FIGS. 7A and 7B, but only for after power up, off state, for a dual transformer configuration, where an R wire from a transformer is accidently miss-wired to a W-O/B terminal.

FIG. 10 is a diagram of a heat pump load connected to an input of detector and an input of another detector that has Zener diode may be connected in series with the input of detector;

DETAILED DESCRIPTION

The present system and approach may incorporate one or more processors, computers, controllers, user interfaces, wireless and/or wire connections, and/or the like, in an implementation described and/or shown herein.

This description may provide one or more illustrative and specific examples or ways of implementing the present system and approach. There may be numerous other examples or ways of implementing the system and approach.

Providing the installer or user the status of voltage on HVAC wires may allow easier troubleshooting of wiring problems, or other problems with the HVAC equipment. The wire-sensing (e.g., voltage sensing, current sensing, etc.) on HVAC components described herein may provide a unique approach of achieving wire-sensing by a means of a single component, solid-state, AC load switch that provides a voltage which is related to AC voltage on the wires and/or the presence of a load with an AC voltage on the other side of the load.

Wire connection problems may be a significant field issue. By sensing the connection integrity, one may correctly diagnose wire installation issues as well as connection failure issues. This approach may reduce false failures and increase customer satisfaction.

Hardware-software detection of HVAC equipment hardwired to a thermostat, HVAC equipment may be hardwired to a thermostat or to some remote interface and directly driven by relays from the thermostat (or the interface). Wires from individual equipment like some heaters, air conditioners, humidifiers, and so on, may be connected to terminals in the thermostat (e.g., interface). An installation of the bundle of wires to the terminal may be confusing and so there can be a risk of incorrect wiring. If the thermostat (e.g., interface) is capable of recognizing which terminals of the thermostat are hardwired with equipment, then an installer may be notified as to which equipment is properly connected to the thermostat (e.g., notified about a number of heat/cool stages, and so forth), and on the other hand, may be notified if something is not connected or is mis-wired. Such equipment detection reduce time needed to install a thermostat when compared to instances where the thermostat does not perform a wire-check.

Further, wire-checks or detections may be periodically repeated. In some cases, periodic wire-checks may also detect an unreliable or failing connection between a thermostat and the equipment (e.g., an improperly tightened screw in a terminal of the thermostat). With the periodic wire checks the system of this disclosure may determine whether the corresponding connection of the detector has an intermittent or poor connection with the load.

Figure 11A:
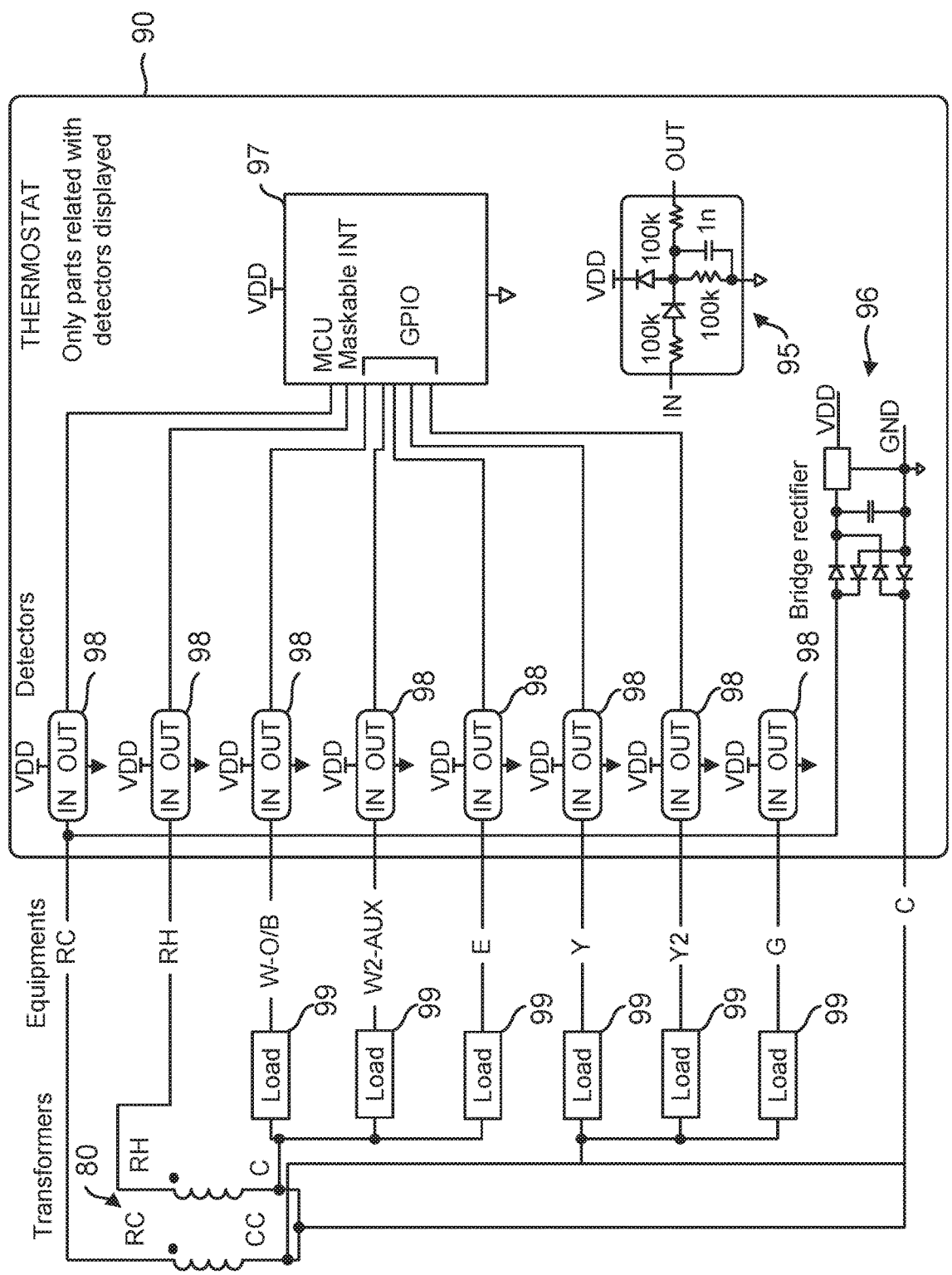
FIG. 11A is a diagram of detector configuration based on detection of an AC voltage on individual output terminals and comparison of a phase of the detected voltages with a phase of a reference.

Equipment and/or wire detection may be based on detection of an AC voltage on individual output terminals and comparison of a phase of the detected voltages on an individual terminal with a phase of a voltage of a reference signal (e.g., an AC voltage on a powering terminal (RC) as shown in FIG. 11A). Detecting AC voltage on a terminal and comparing a phase of the detected AC voltage to a phase of a voltage of a reference signal may allow a processor implemented in circuitry to detect one or more situations in a system including the equipment. When configured with the described detecting and comparing concept, the processor implemented in circuitry may be able to identify if a piece of equipment is connected or is not connected to a corresponding terminal; if an RH wire (from a transformer secondary winding) is mis-wired to one or more output terminals; and/or if an AC voltage is coming from a piece of equipment. A primary winding of the transformer is for connection to electrical line power.

The wire and equipment detection configuration may include voltage limiters with a half-wave rectification to detect wires and/or equipment connected to terminals of a thermostat and/or when wires and/or equipment are not connected to terminals of the thermostat. If no AC voltage is detected on an output terminal of the thermostat, processor implemented in circuitry may determine, with a software (SW) algorithm, that equipment is not connected to the output terminal of the thermostat. If an AC voltage is detected on the output terminal of the thermostat and a phase of the AC voltage is shifted 180 degrees relative to a voltage of a related reference signal, then the processor implemented in circuitry, with the SW algorithm, may recognize a that equipment and/or a wire (e.g., a load) is connected to the terminal of thermostat because a voltage from a C terminal (e.g., which may be tied with the transformer secondary winding) passes through an equipment load impedance on its way to the terminal of the thermostat. While a load may be energized by a thermostat (e.g., a relay in thermostat connects an RH or RC with some of the output terminals), then a detected voltage on that terminal may immediately change its phase from 180 degrees to 0 degrees.

A virtual ground potential, which is created by a bridge rectifier, may be powered from RC and C terminals and one of the bridge outputs (e.g., GND, which may be tied to a ground of all electronic circuits including all terminal detectors). This configuration may lead to why the detectors are able to "see" the AC voltage on both ends of the transformer winding (RC and C). This configuration may allow the phase detection concept discussed above to be utilize in thermostats (e.g., interfaces) powered through a bridge rectifier. If a half-wave rectifier is used, a GND may be directly connected to a C terminal and a different detection principle may be utilized.

Some thermostat and heating, ventilation, and air conditioning (HVAC) equipment configurations may use a so-called dual transformer configuration where a system of a thermostat and connected loads (e.g., HVAC equipment), may be powered from two transformers. In that case, first ends of the windings may be tied together and connected to a C terminal and second ends may be connected to the RH and RC terminals. If the windings of both transformers have a same orientation, then the voltage waveforms on the RC and RH terminals may have the same phase and the whole system can work in a way similar to when only a single transformer is used and the RH and RC terminals are tied together.

A specific situation may occur when winding orientations of both transformers are not the same. For example, a voltage on the RH terminal may have a reversed phase, and a voltage waveform of the voltage on the RH terminal may not have a positive half-wave character. Circuitry may create the voltage waveform of the voltage on the RH terminal by a superposition of a sine wave and positive half-wave signals that may result in an asymmetrical AC waveform, where positive half-waves have a two-times higher level than negative waveforms (V(RC) waveform). The described situation may result in a case were a detecting circuit may detect a same phase for C and for RH terminals. As a result, the detecting circuit may have an ability to recognize a connected load, but does not necessarily have an ability to recognize whether the load is energized or not. In some cases, it may not matter because the thermostat may "know" when it is energizing a load and when it is not the load and information from a detector about a load state (e.g., where the state may be the load is energized or the load is not energized, and/or one or more other suitable states) may be redundant.

However, there may be instances when the windings of the two transformers are not the same. In a first example, the thermostat may not be able to detect a heat pump alert. In a second example, the thermostat may not be able to detect a miss-wired RH terminal to some of the output terminals. As such, in a case of reversed transformer windings (e.g., winding orientations of both transformers are not the same), the system may be capable of detecting only the connected equipment and the reversed winding. But still, an installer may be informed that the detection does not necessarily cover some specific states because of a reversed winding.

The present system may have a software component. A stack level may be that of sensors, that is, a hardware device with some embedded software for measuring/detecting and transmitting data (e.g., temperature, pressure, motion). The software type may be embedded, that is, the software may run in a device/unit (e.g., firmware).

Preliminary wire sensing requirements may incorporate: detection of equipment wired to thermostat after thermostat's power up; terminal loads: W-O/B, W2-AUX, E, Y, Y2, G, L, (R, RC); Heat-pump failure alert signal detection capability; Proper functionality ensured also in case of mis-wiring one of the transformers (one of them may have a reversed winding) (e.g., such as one of the transformers 80 depicted in FIG. 11A); and a thermostat (e.g., such as a thermostat 90 depicted in FIG. 11A) powered through a bridge rectifier (e.g., such as the circuit 96 depicted in FIG. 11A).

Exceptions may incorporate the following. Universal (U) terminal detection is not necessarily required; and proper functionality if a second transformer does not have its C wire connected together with a powering transformer's C wire which is inserted in a C terminal.

Wire and/or equipment detection at a thermostat may occur in one or more additional or alternative manner to that described above. In one example, wire and/or equipment detection using simple zero cross detectors may involve an OFF state: W_DET pulses phase shifted by R_DET pulses. In the OFF state the detection is possible if the phases are compared. An ON state may have W_DET pulses in phase with R_DET pulses.

In dual transformer configurations, if phases of both transformers are detected and a smart software phase analyzer is implemented, then a reliable functionality may be ensured. In such cases, a heat-pump fail signal may be detected by a particular technique using two detectors.

Figure 8A:
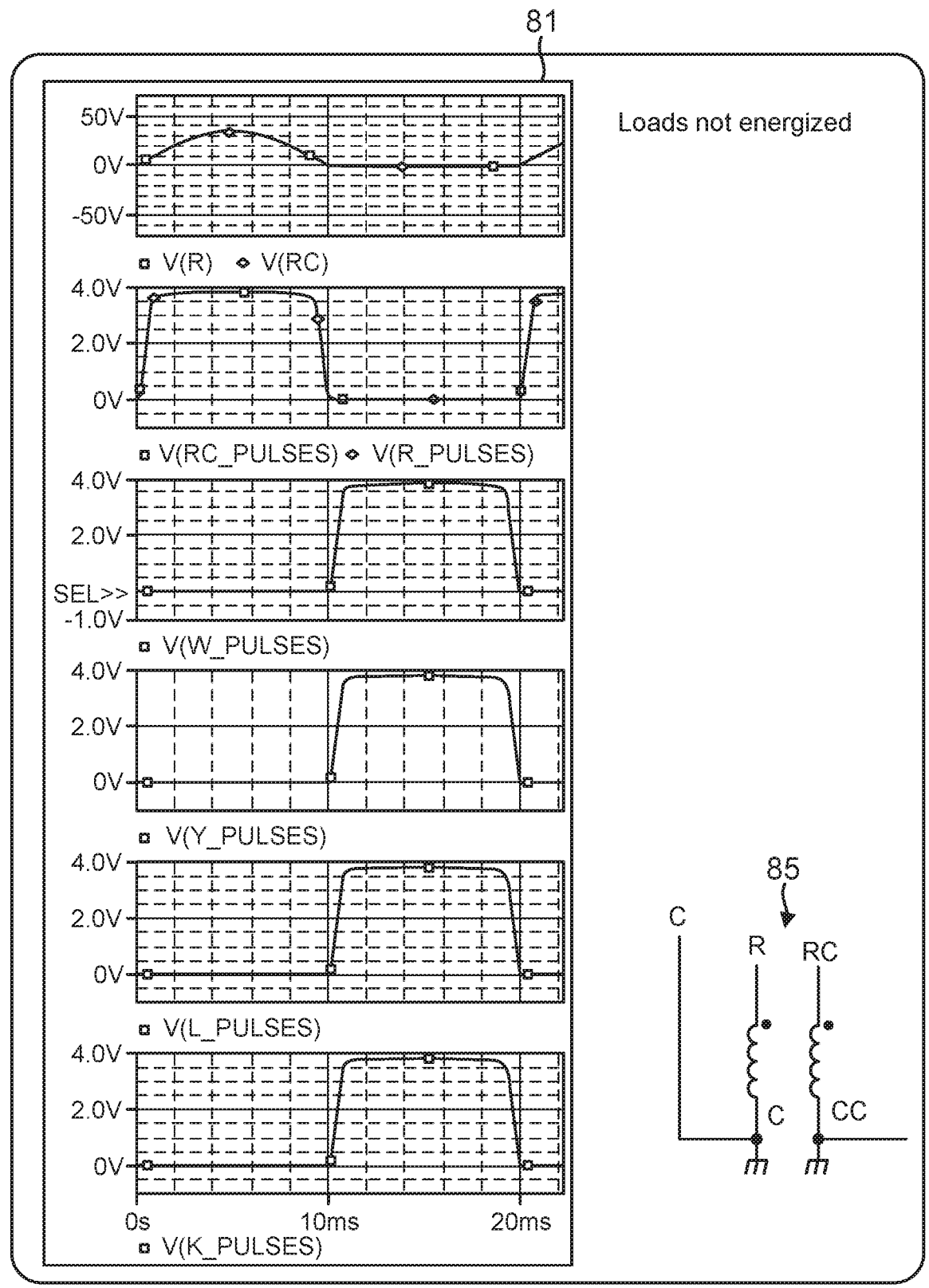
FIG. 8A is a diagram of waveforms where loads are not energized, with a transformer configuration.
Figure 8B:
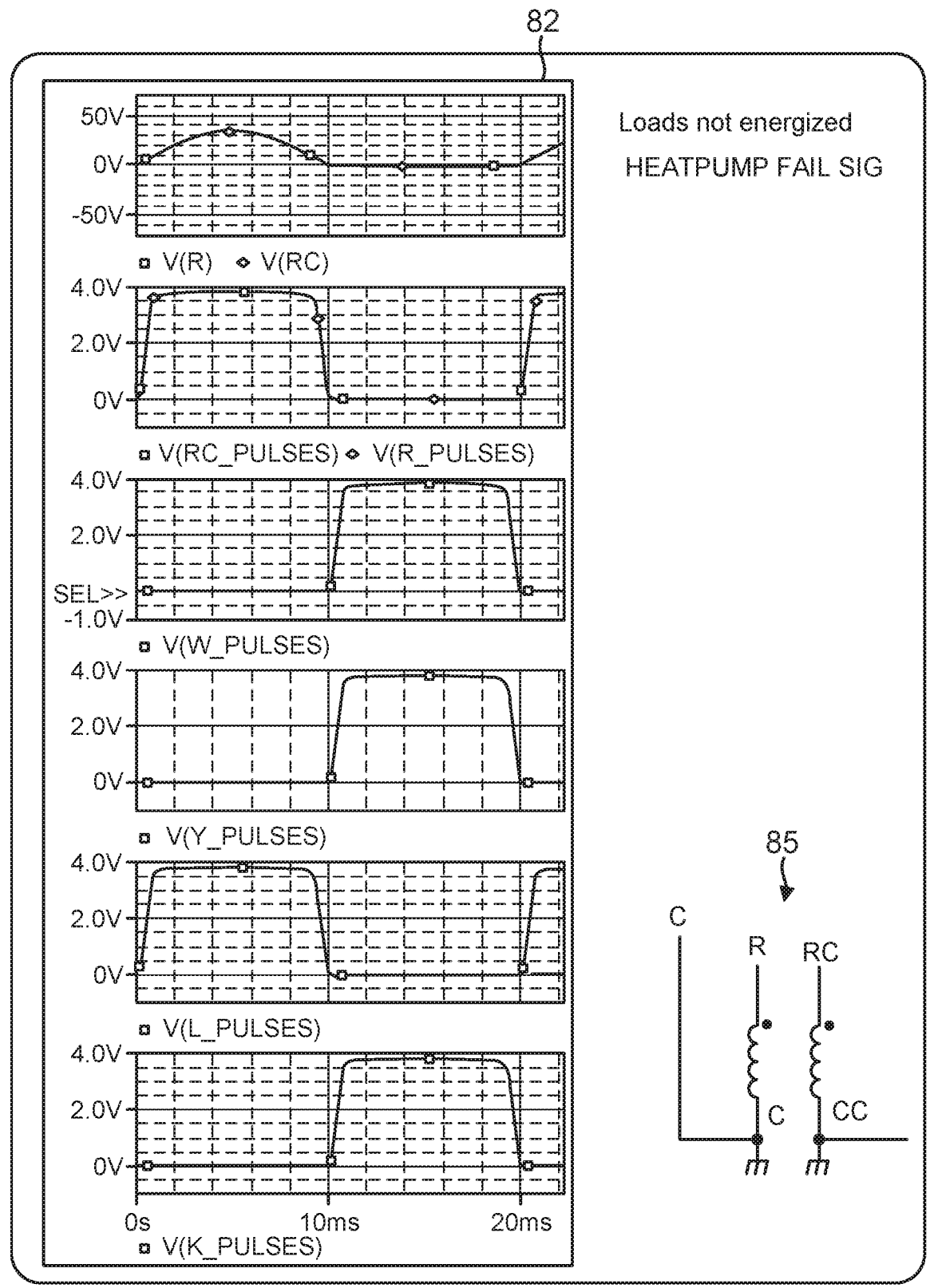
FIG. 8B is a diagram of waveforms where loads are not energized, having a heat pump fail signal, with transformer configuration.
Figure 8C:
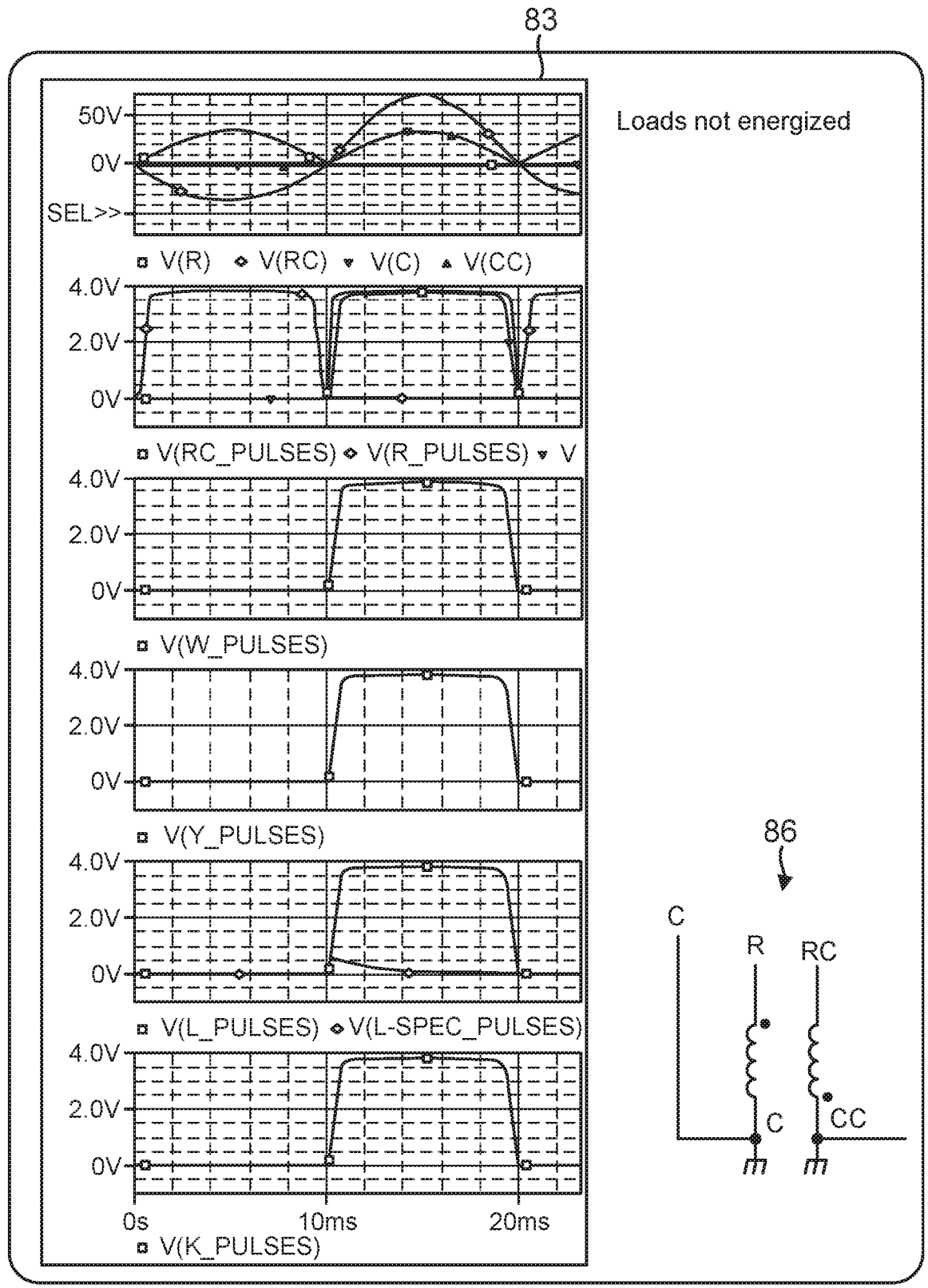
FIG. 8C is a diagram of waveforms where loads are not energized, with a transformer configuration.
Figure 8D:
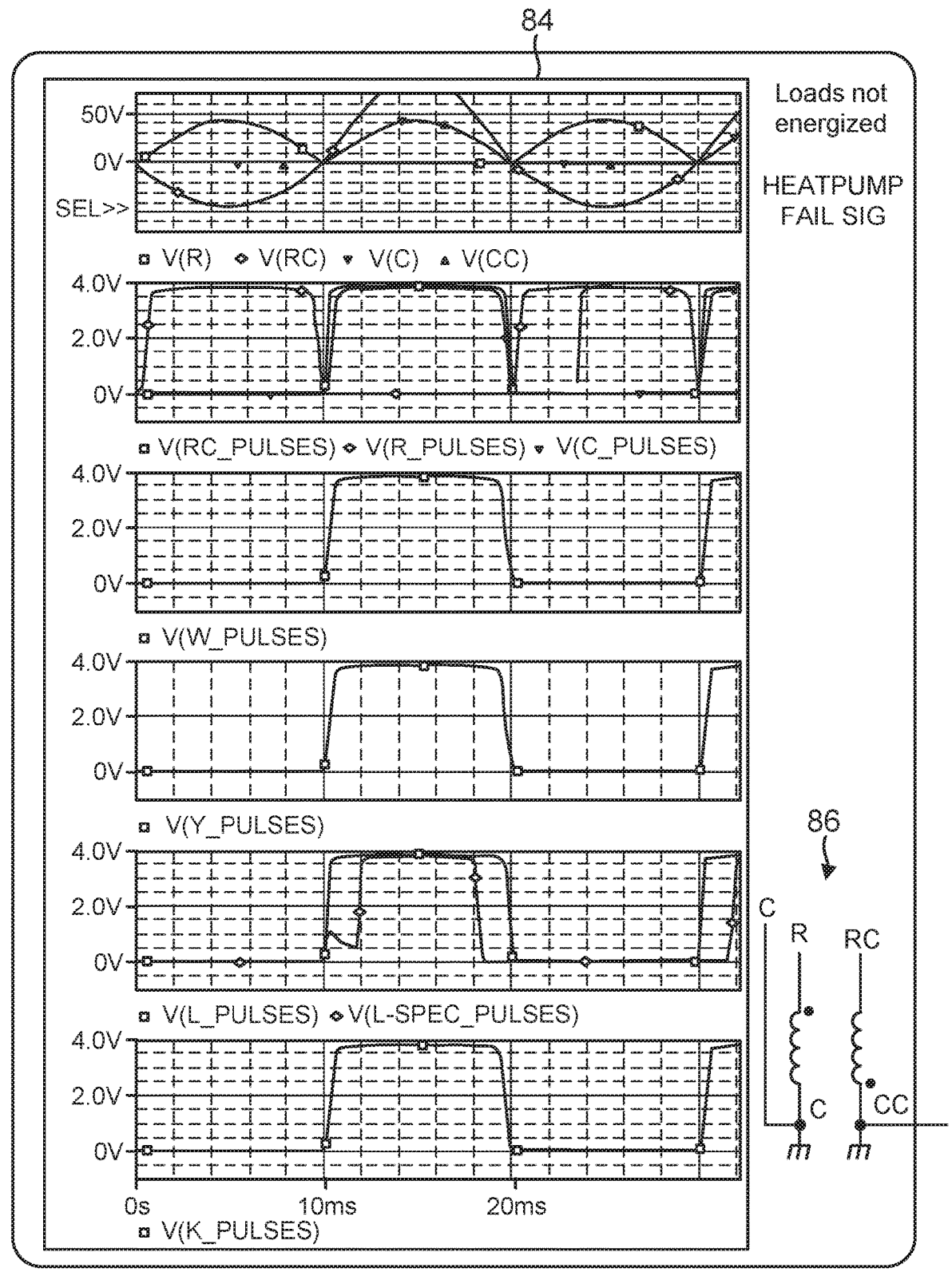
FIG. 8D is a diagram of waveforms, where the loads are not energized, having a heat pump fail signal, with transformer configuration.

FIG. 8A is a diagram of waveforms 81 where loads are not energized, with a transformer configuration 85. FIG. 8B is a diagram of waveforms 82 where loads are not energized, having a heat pump fail signal, with transformer configuration 85. FIG. 8C is a diagram of waveforms 83 where loads are not energized, with a transformer configuration 86. FIG. 8D is a diagram of waveforms 84, where the loads are not energized, having a heat pump fail signal, with transformer configuration 86.

In a dual transformer configuration, a heat pump fail detector may be noted. If a second transformer is wired in reverse, then a pulse signal from a zero cross detector at an L terminal of the thermostat may have a same phase regardless of whether the heat-pump is transmitting the heat-pump fail alert or not (see the V(L_PULSES) waveforms. As such, the detector may be able to detect an occurrence of the heat pump equipment, but may not be able to recognize the heat pump fail alert. In some cases, the lack of ability to recognize the heat pump fail alert may be caused by non-symmetrical AC voltage on an RC terminal referenced to a GND.

Figure 9A:
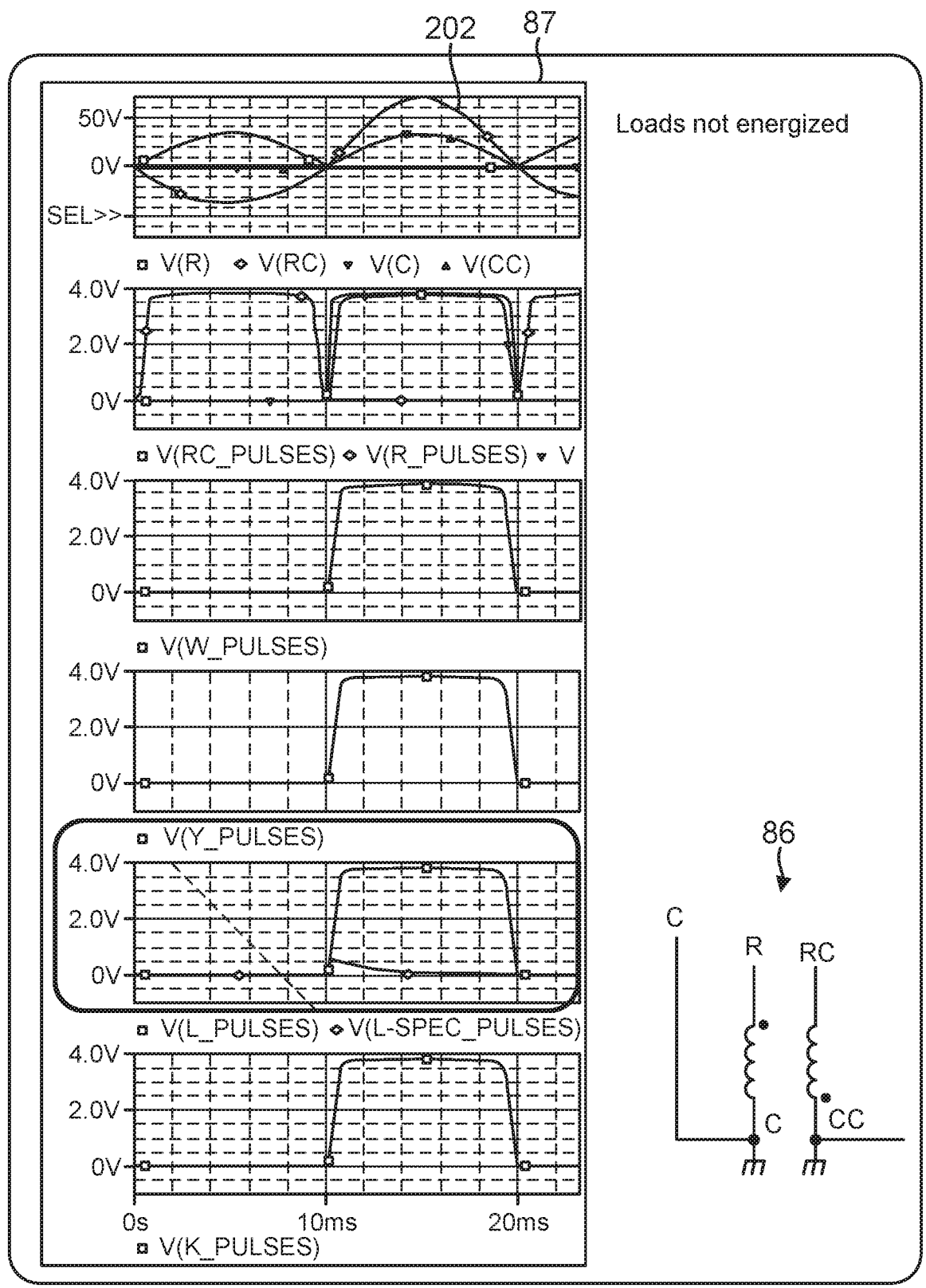
FIG. 9A is a diagram of waveforms where loads are not energized, with transformer configuration.
Figure 9B:
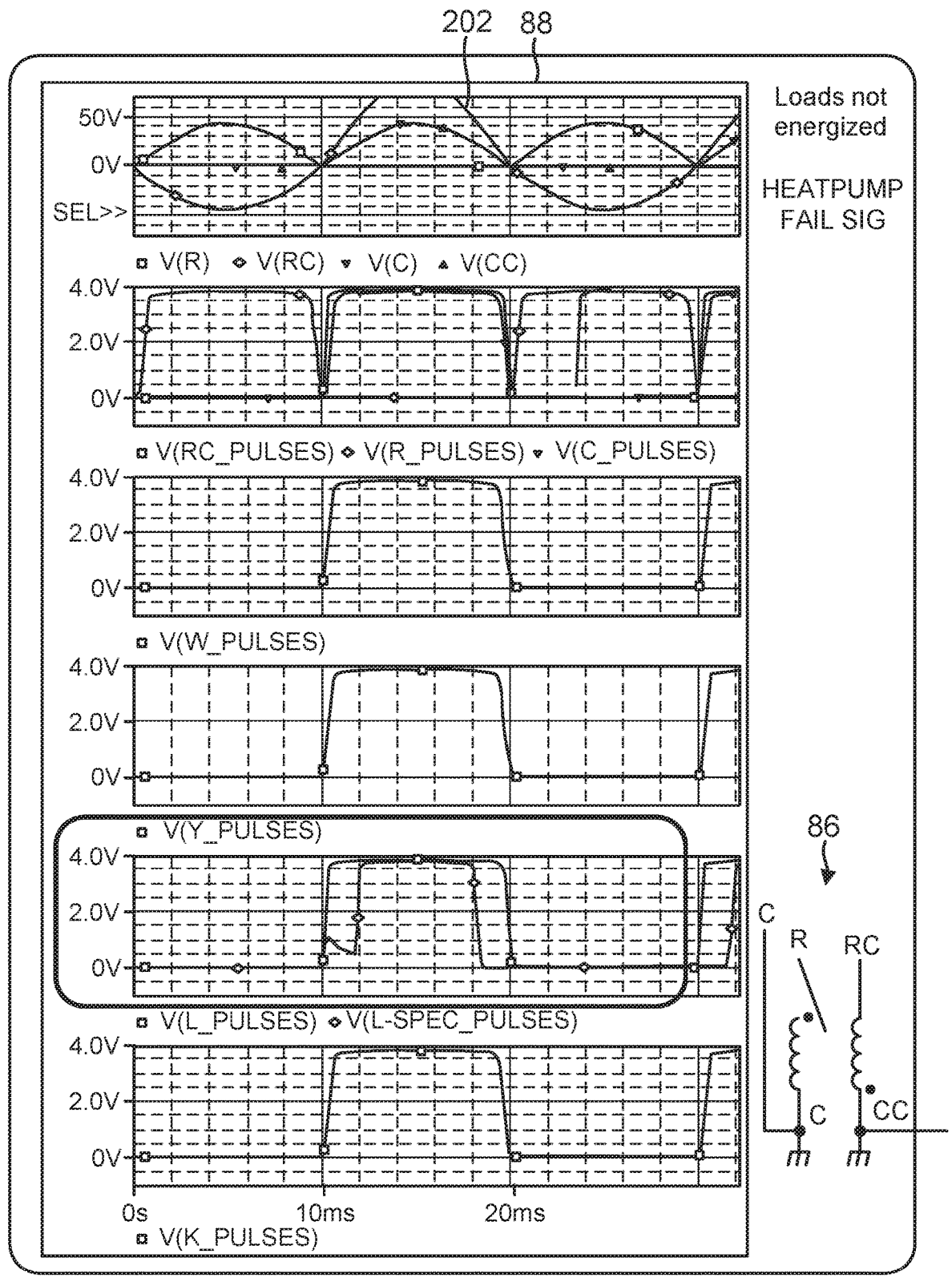
FIG. 9B is a diagram of waveforms, where the loads are not energized, having a heat pump fail signal with transformer configuration.

FIG. 9A is a diagram of waveforms 87 where loads are not energized, with transformer configuration 86. FIG. 9B is a diagram of waveforms 88, where the loads are not energized, having a heat pump fail signal with transformer configuration 86. A waveform 202 may have the positive half-waves two times higher than negative half-waves.

FIG. 10 is a diagram of a heat pump 89 (e.g., a load) connected to an input 91 of a thermostat (not shown in FIG. 10) (e.g., an input of a detector) and an input 92 of the thermostat(e.g., an input of a detector, where the inputs 91, 92 may be utilized to detect a presence of equipment and/or wires. A Zener diode 93 may be connected in series with the input 92 of the thermostat.

Again in a dual transformer configuration, a heat pump fail detector may be noted. If an additional zero-cross with an approximately 43 volt Zener shifter (e.g., the Zener diode 93 in FIG. 11) is utilized, then one may be able to detect the heat-pump fail alert in virtually all cases (e.g., with transformers in phase and with windings in a same orientation or with a reversed transformer phase with windings in different orientations). The shifted detector of the thermostat may provide an auxiliary pulse signal V(L-SPEC_PULSES) that allows for detection of the heat-pump alert.

A system with a full configuration may need ten or different number of detectors plus at least one Zener diode 93. There may be input/output (I/O) requirements (for the system) with one GPIO with a maskable interrupt option and nine standard GPIO's.

Figure 11B:
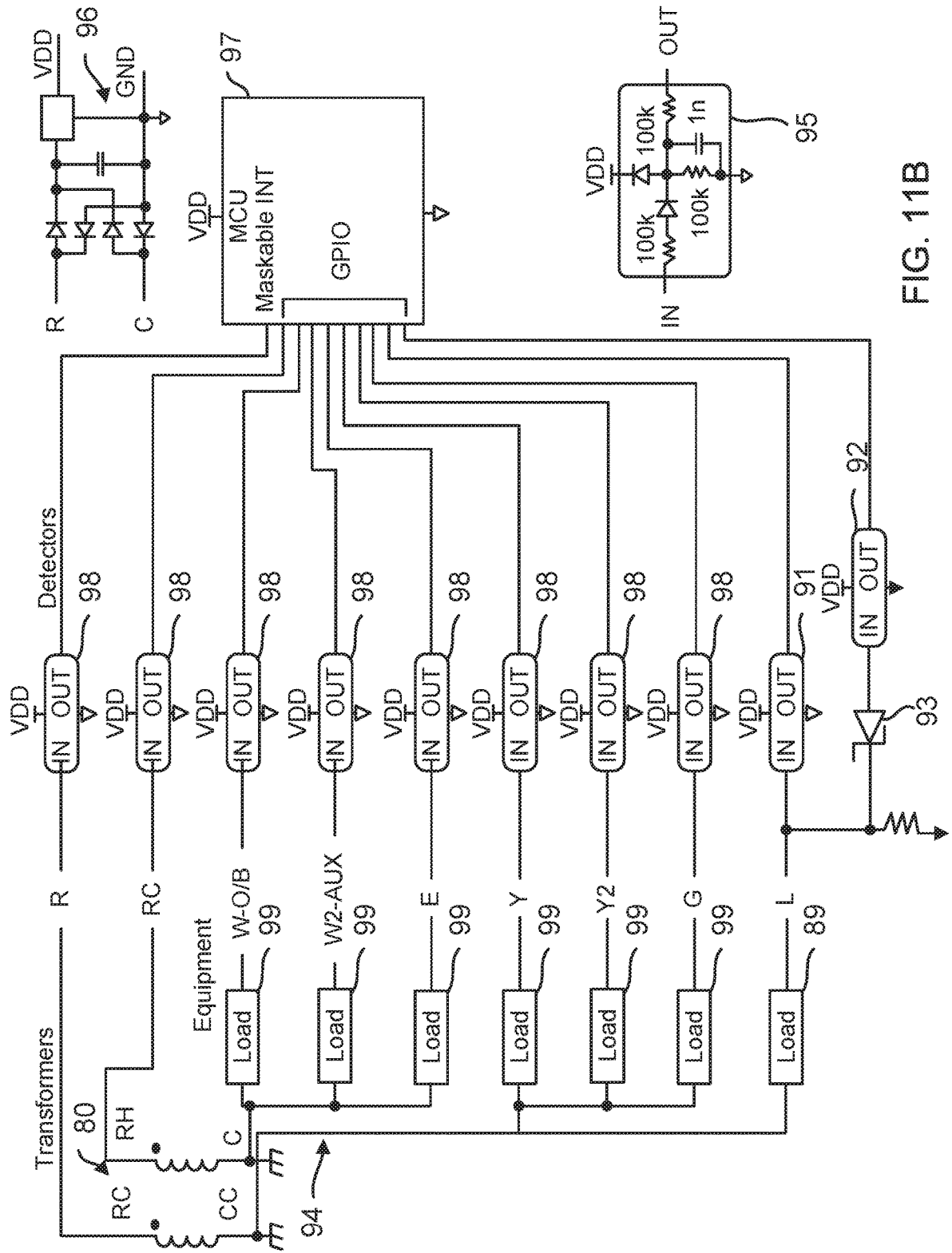
FIG. 11B is a diagram of a configuration with various loads connectable individually to numerous detectors including detectors for a heat pump along with a Zener diode input to a latter detector.

FIG. 11B is a diagram of a configuration 94 with loads 99 (W O/B, W2-AUX, E, Y, Y2, G and L) connectable, respectively, to ten detectors 98 including the noted detectors 91 and 92 along with Zener diode 93. A circuit 95 may be used for virtually all detectors 98 in configuration 94, including detectors 91 and 92. Circuit 96 is a bridge full-wave rectifier for DC power (VDD), with a filter capacitor and voltage regulator, for detectors 98 and microcontroller 97. Microcontroller 97 may represent a non-limiting example of one or more processors.

Functional tests may be performed. Pulse waveform shapes and phases may be captured on a real prototype wired to a thermostat and compared with the PC simulations. Real behavior may correlate with simulations. There may be stress tests such as terminal ring-wave experimental tests, and ESD (belly up) experimental tests. Balancing may be performed.

Benefits of the present system may include simple passive circuitry, very low cost components, and reliability with a dual transformer configuration.

If C wires are connected together, an issue in some cases may be resolvable by a special resistor connected between terminals R and RC. But in that case, a winding orientation should be same to avoid heat generation on that resistor.

If functionality using a separated C wire is needed, one may connect an additional resistor between R and RC terminals which injects an AC voltage referenced to a thermostat's ground to the second transformer's loop. Then the detection may work for both loops independently whether the second C is connected to a thermostat or not. In this case, however, it may not be possible to detect a heat-pump alert.

Advantages of an additional resistor are simplicity and low cost. Concerns of the additional resistor may include prevention of heat generation in that the transformers must be wired properly (in phase) if both C wires are tied together. Also, to meet the properly phased transformer condition, there should be some user alert of improper installation which asks the user/installer to reconnect the transformer's winding as necessary. This may be unpleasant not only for DIY customers but also for contractors. If the second C is not connected to the thermostat, a heat-pump alert will not necessarily work.

Using the detectors with a resistor between R and C, the system may be able to work properly if the second C wire is unconnected. One may need to repair the transformer's wiring if non-phased transformers are detected. Heat pump failure detection may work properly with the additional resistor.

FIGS. 1A, 1B, 1C and 1D illustrate a principle of detection with zero cross-detectors of a thermostat 30.

Figure 1A:
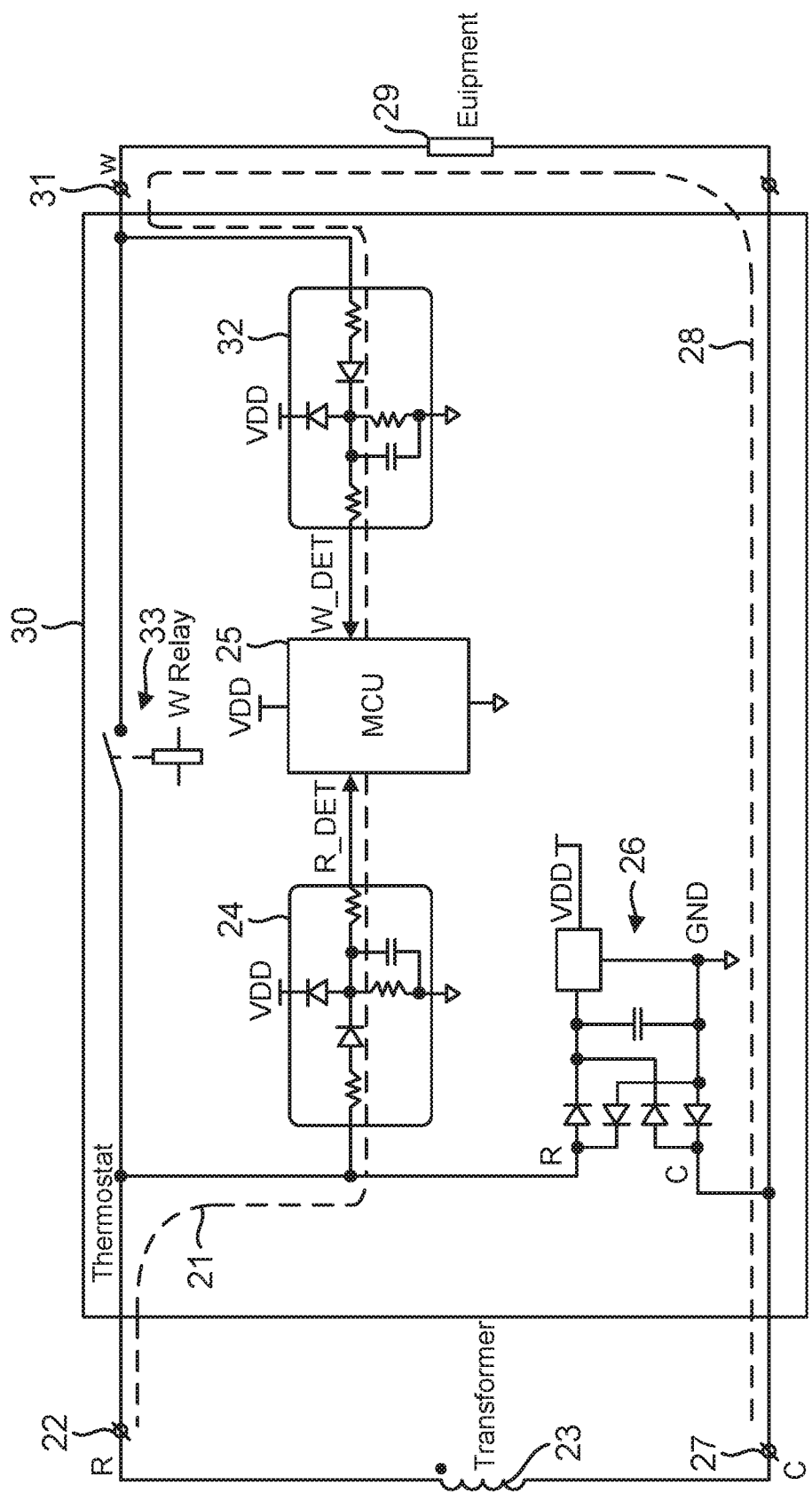
FIG. 1A is a schematic of a first circuit associated with a thermostat illustrating a principle of detection.
Figure 1B:
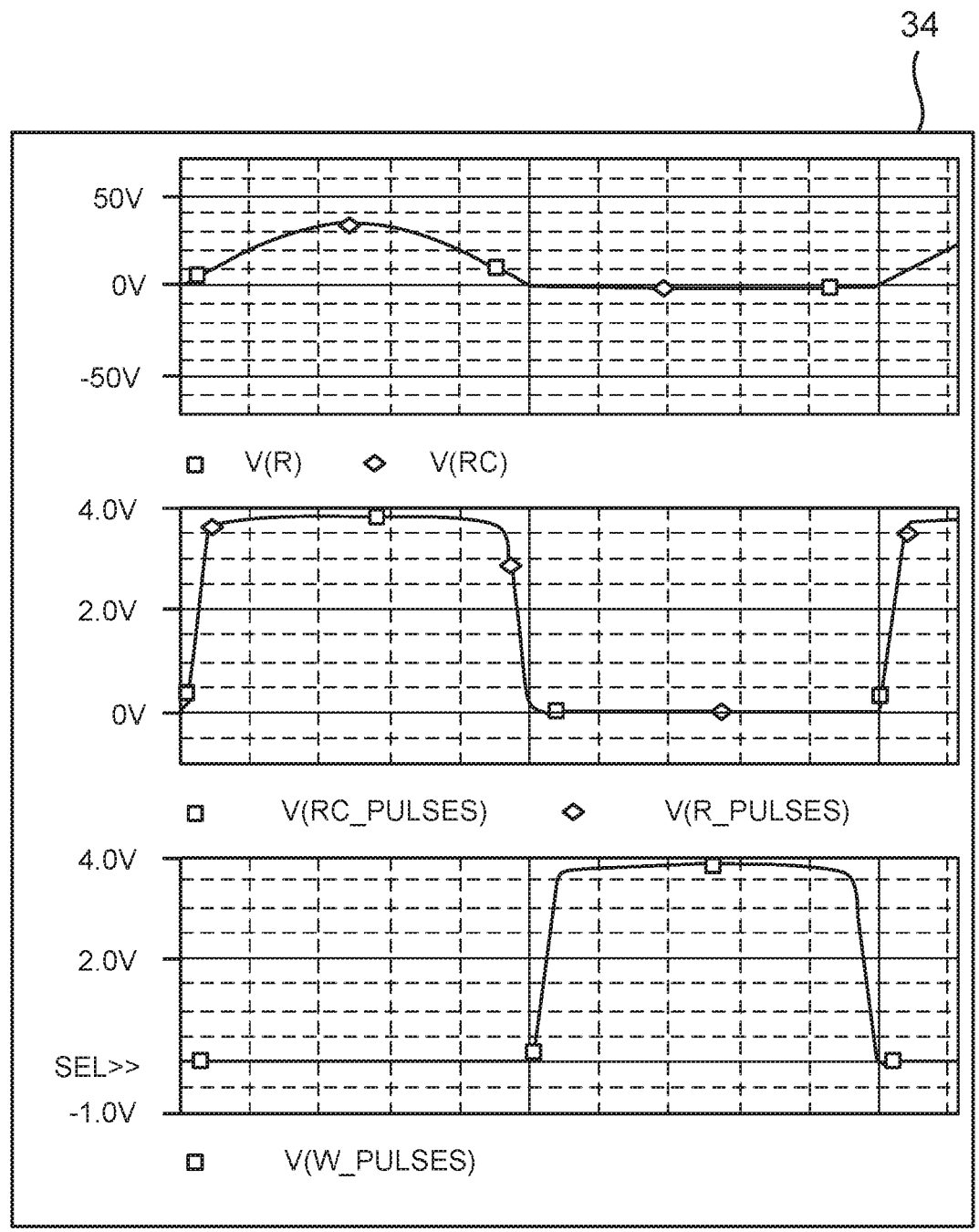
FIG. 1B is a diagram of waveforms corresponding to the OFF state of the circuit in FIG. 1A.

FIG. 1A is a schematic of a circuit associated with a thermostat 30 illustrating a principle of detection. FIG. 1B is a diagram 34 of waveforms corresponding to the OFF state of the circuit in FIG. 1A.

Figure 1C:
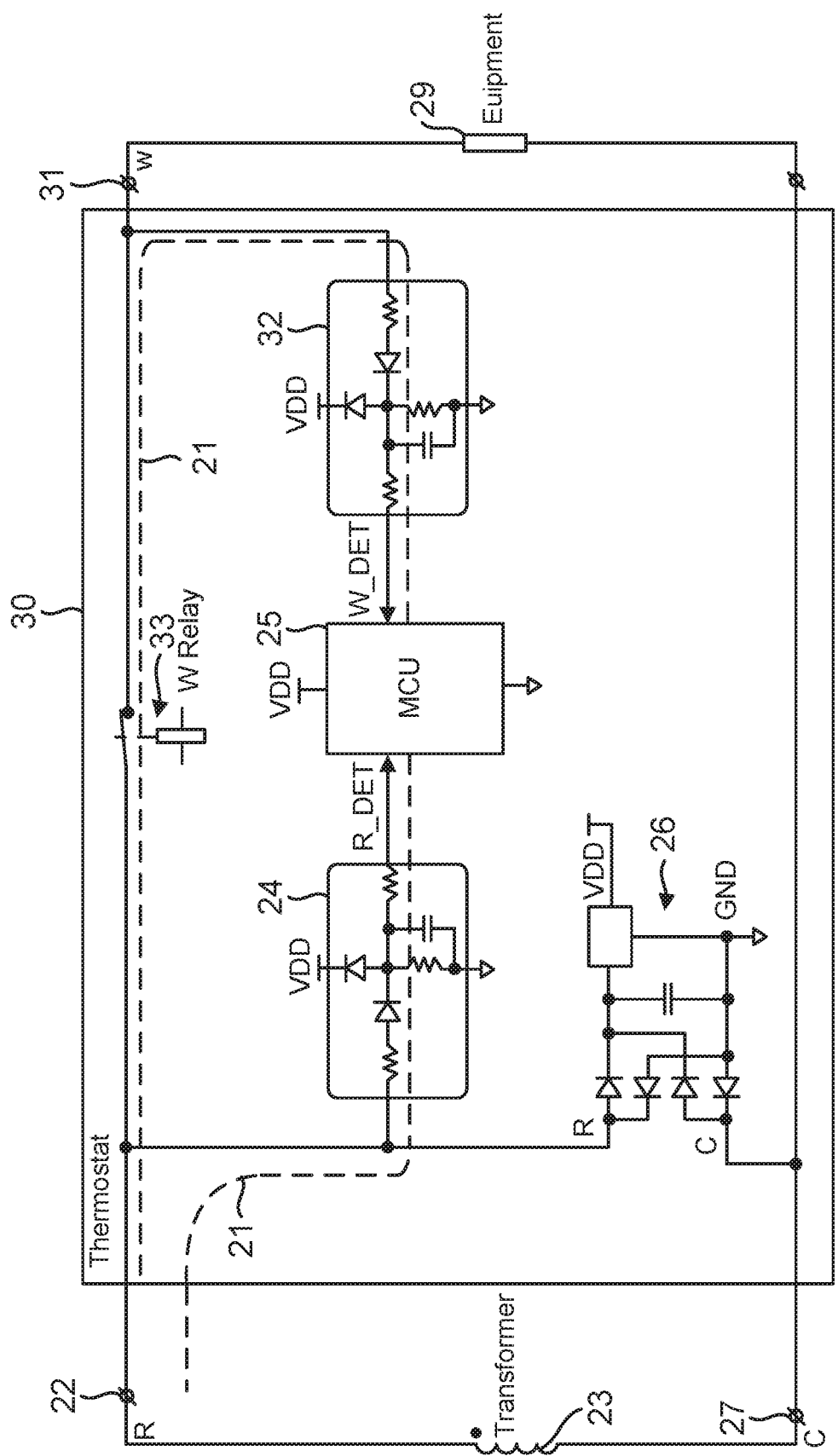
FIG. 1C is a schematic of a circuit associated with a thermostat illustrating a principle of detection.
Figure 1D:
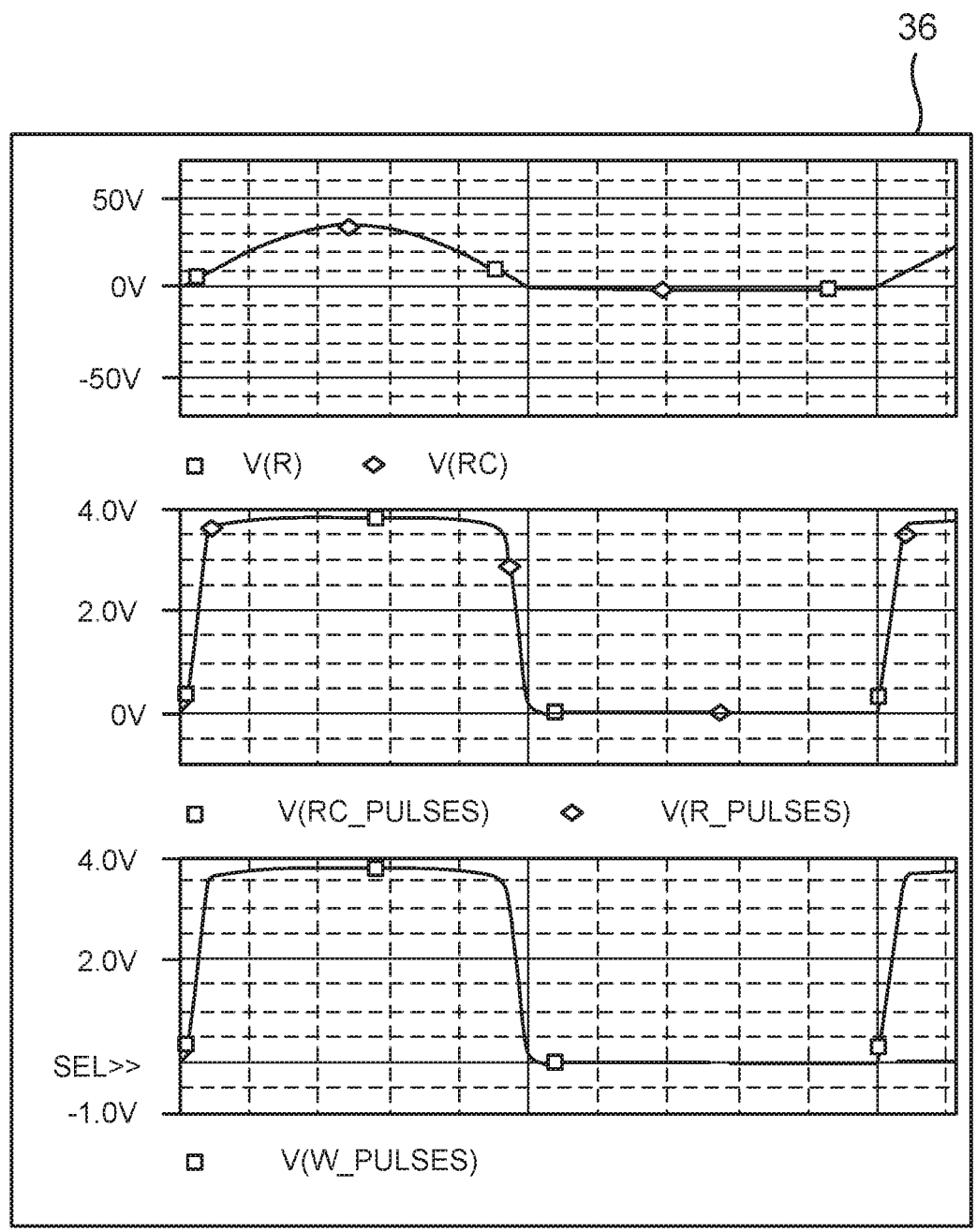
FIG. 1D is a diagram of waveforms corresponding to the ON state of the circuit in FIG. 1C.

FIG. 1C is the circuit associated with thermostat 30, with respect to the principle of detection. Signal 21 may go from terminal 22 through detector 24 to MCU 25. MCU 25 may represent a non-limiting example of one or more processors. Also, signal 21 may go through closed switch 33 and detector 32 to MCU 25. In an ON state, W_DET pulses may be in phase with R_DET pulses. FIG. 1D is a diagram 36 of waveforms corresponding to the ON state of the Circuit in FIG. 1C.

As shown in FIGS. 1A and 1B, a signal 21 from terminal 22 (R) from a dot-end transformer 23 through detector 24 to MCU 25. Voltage VDD may be provided to MCU 25 and detectors 24 and 32 by a bridge full-wave rectifier 26 which is connected across terminals 22 and 27 (C) of transformer 23. In an off state, W_DET pulses may be phase shifted by R_DET pulses. A signal 28 may go from terminal 27 through equipment 29 through terminal 31 (W) and detector 32 to MCU 25. In the OFF state, detection is possible if the phases are compared. For example, MCU 25 may compare a phase of signal 21 with a phase of signal 28. A switch 33 connected between terminals 22 and 31 is open.

Figure 2A:
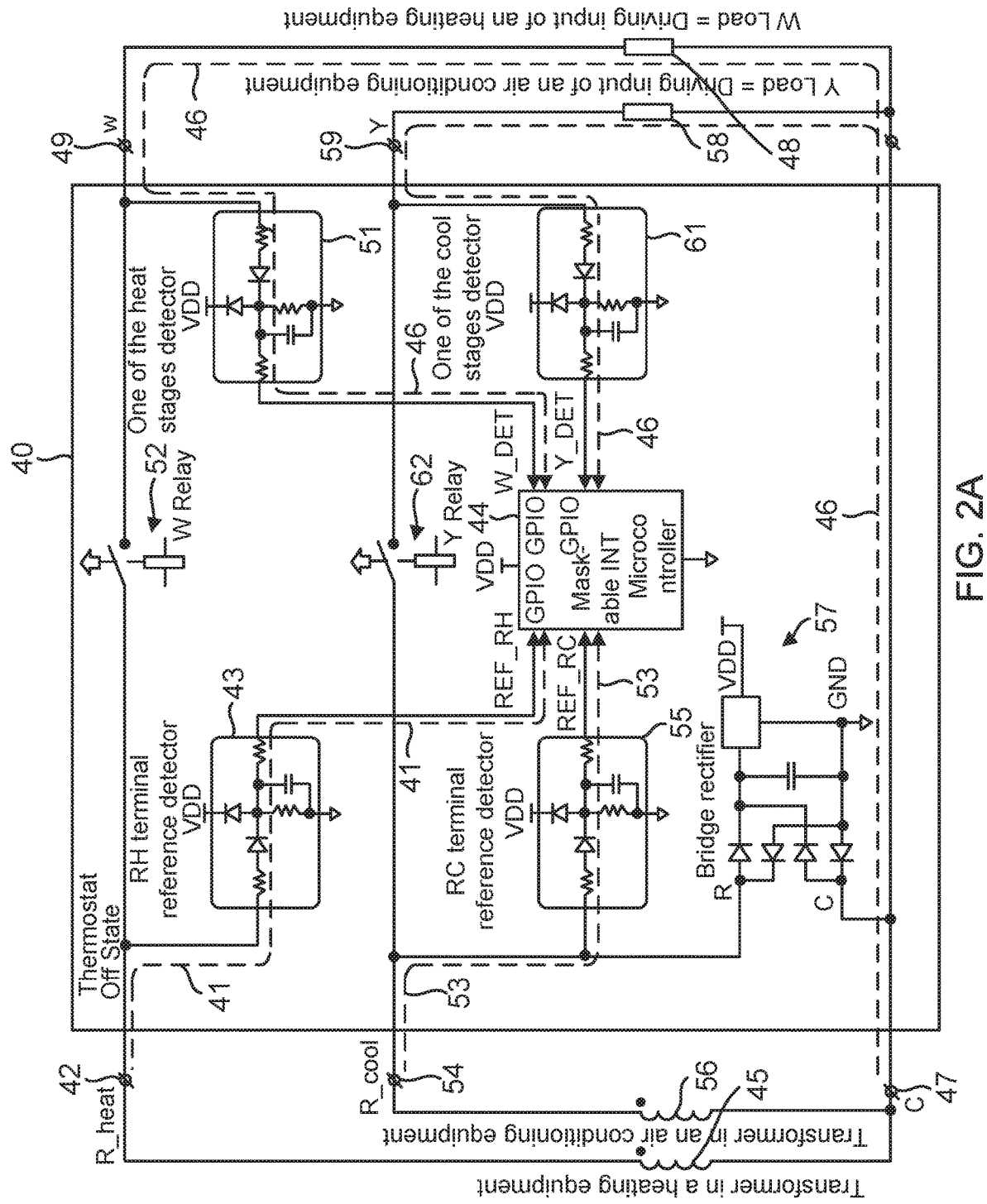
FIG. 2A is a diagram of circuitry associated with thermostat in an OFF state.

FIG. 2A is a diagram of circuitry associated with thermostat 40 in an OFF state. A signal 41 may go from a terminal 42 (R_heat) through an RH terminal reference detector 43 as signal REF_RH to a terminal GPIO of microcontroller 44. Microcontroller 44 may represent a non-limiting example of one or more processors. Terminal 42 may be connected to a dot end of a transformer 45 in heating equipment. A signal 46 may go from a terminal 47 (C) through a W load 48 (i.e., a driving input of heating equipment), through a terminal 49 (W) and a heat stage detector 51 on to a GPIO input of microcontroller 44 as signal 46 (W_DET). Terminal 47 may be connected to a non-dot end of transformer 45. A switch 52 connected between terminals 42 and 49 may be open.

A signal 53 may go from a terminal 54 (R_cool) through an RC terminal reference detector 55 to a maskable INT terminal of microcontroller 44. Terminal 54 may be connected to a dot end of a transformer 56 in air conditioning equipment. Terminal 47 may be connected to a non-dot end of transformer 56. A bridge full-wave rectifier 57 may be connected across terminals 47 and 54 to provide DC power.

Figure 2B:
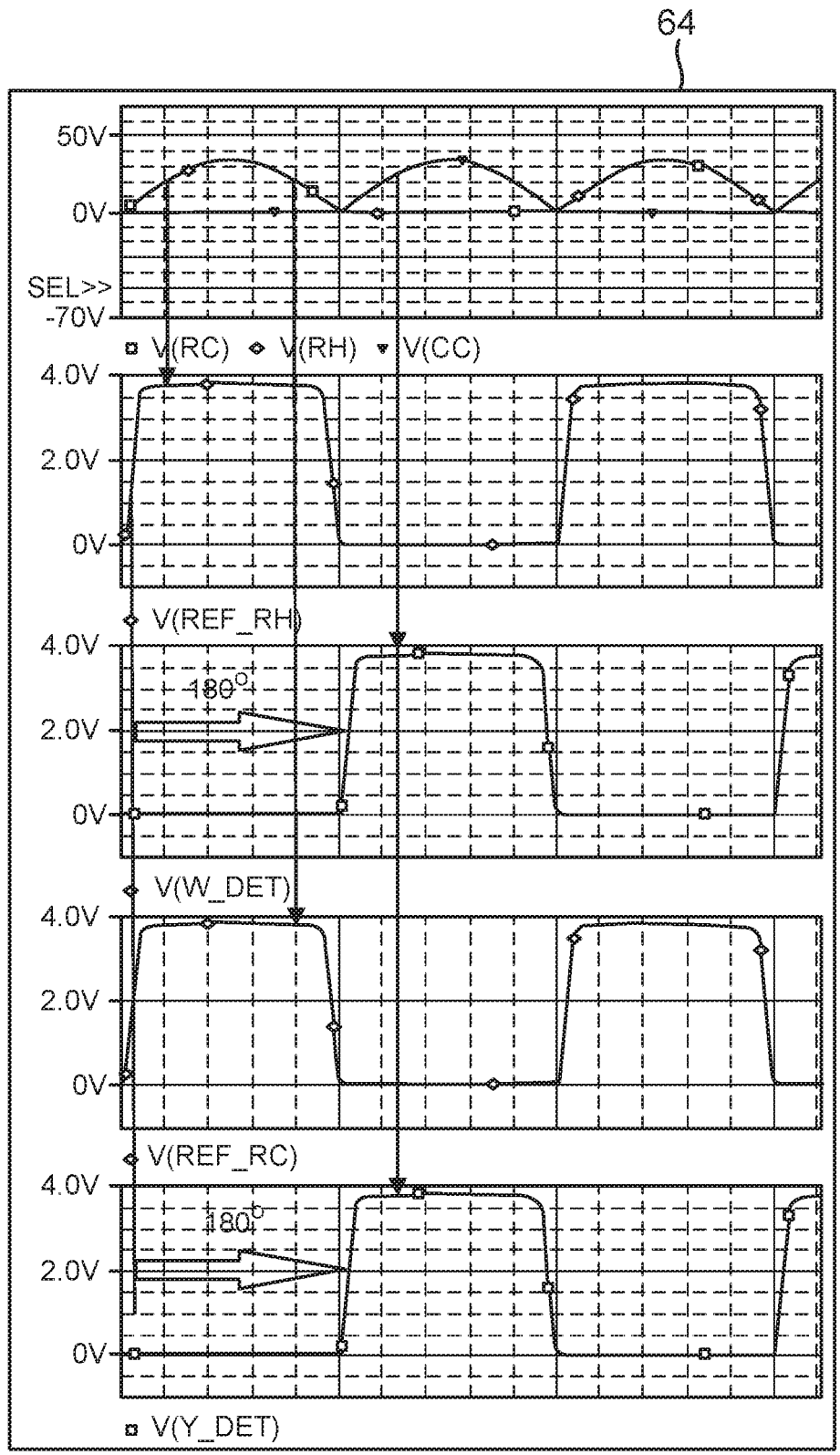
FIG. 2B is a diagram of waveforms corresponding to the circuit of FIG. 2A.

Signal 46 may go through a Y load 58 (i.e., a driving input of air conditioning equipment), through terminal 59 (Y) and a cool stage detector 61 on to a GPIO input of microcontroller 44 as signal 46 (Y_DET). A switch 62 connected between terminals 54 and 59 may be open. FIG. 2B is a diagram 64 of waveforms corresponding to the circuit of FIG. 2A.

Figure 3A:
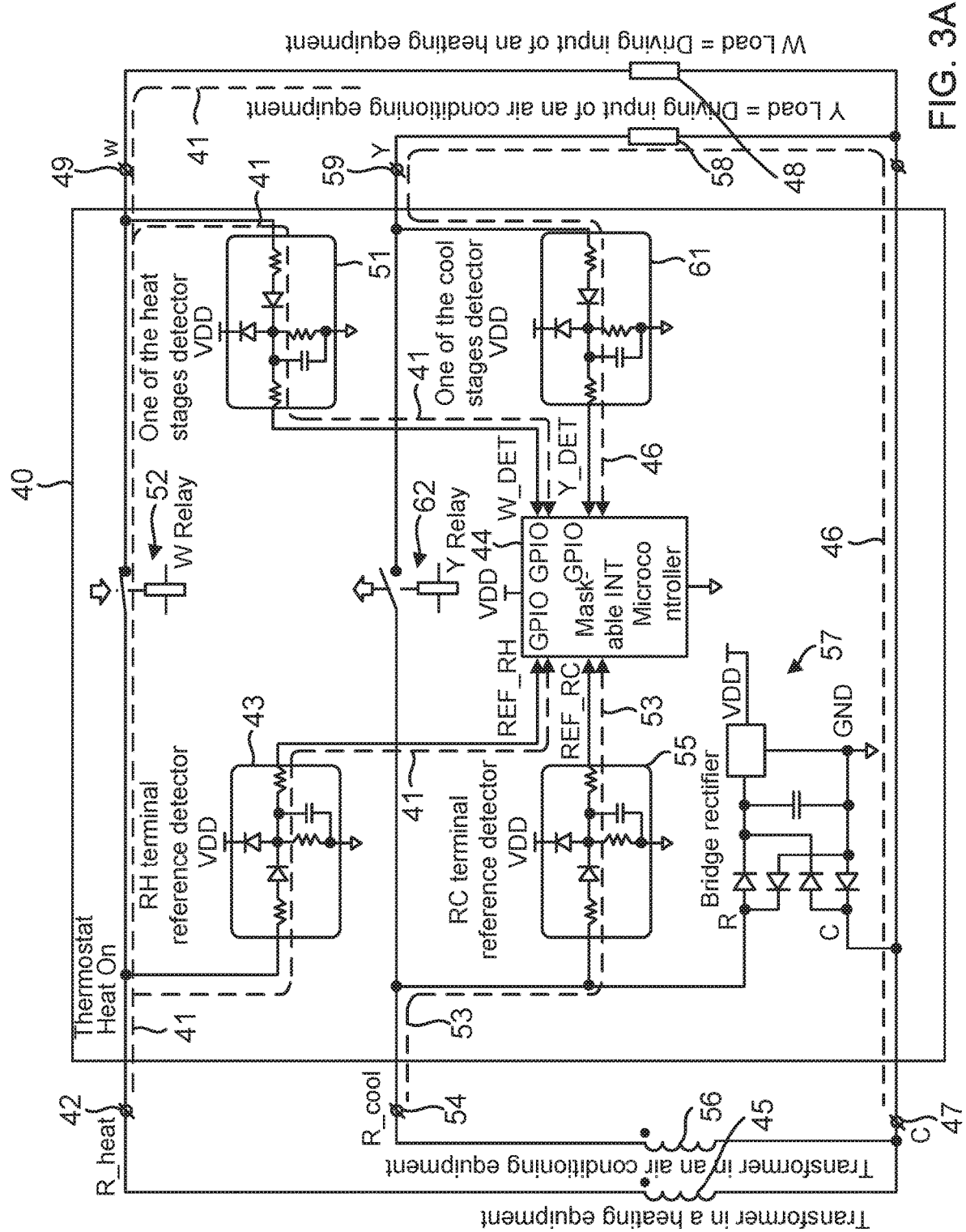
FIG. 3A is a diagram of circuitry associated with thermostat in a heat on state.

FIG. 3A is a diagram of circuitry associated with thermostat 40 in a heat on state. Signal 41 may go from terminal 42 (R_heat) through an RH terminal reference 43 as a signal REF_RH to a terminal GPIO of microcontroller 44. Signal 41 may also go through a closed switch 52 to and through one of the heat stages detector 51 to a terminal GPIO as signal W_DET at microcontroller 44. Signal 41 may also go to through terminal 49 (W) connected to a W load (i.e., a driving input of heating equipment). A terminal 42 may be connected to a dot-end of the transformer 45 (in heating equipment).

Figure 3B:
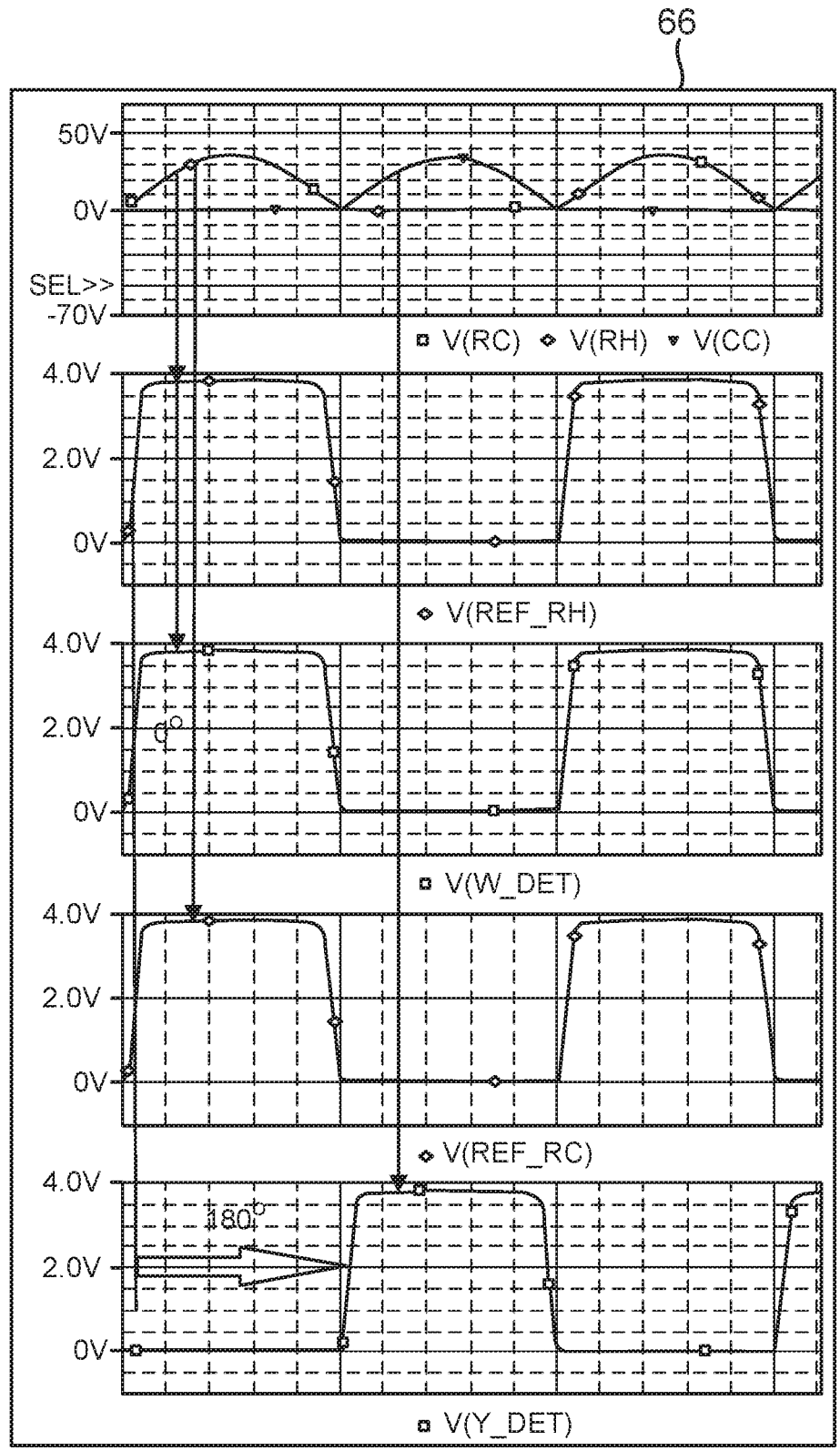
FIG. 3B is a diagram 66 of waveforms corresponding to the circuit of FIG. 3A.

A signal 53 may go from a terminal 54 (R_cool) through an RC terminal reference detector 55 on as a signal RF_RC to terminal maskable INT input of microcontroller 44. Terminal 54 may be connected to a dot end of transformer 56 (in air conditioning equipment). A signal 46 may go from terminal 47 (C) through a Y load 58 (i.e., a driving input of air conditioning equipment), and through one of the cool stage detector 61 to a GPIO terminal of microcontroller 44 as Y_DET signal. Terminal 47 may be connected to a non-dot end of transformer 56 and a non-dot end of transformer 45. An open switch 62 may be connected between terminal 54 and terminal 59 (Y). A bridge full-wave rectifier 57 may be connected across terminal 54 and 47 to provide DC power (VDD). FIG. 3B is a diagram 66 of waveforms corresponding to the circuit of FIG. 3A.

Figure 4A:
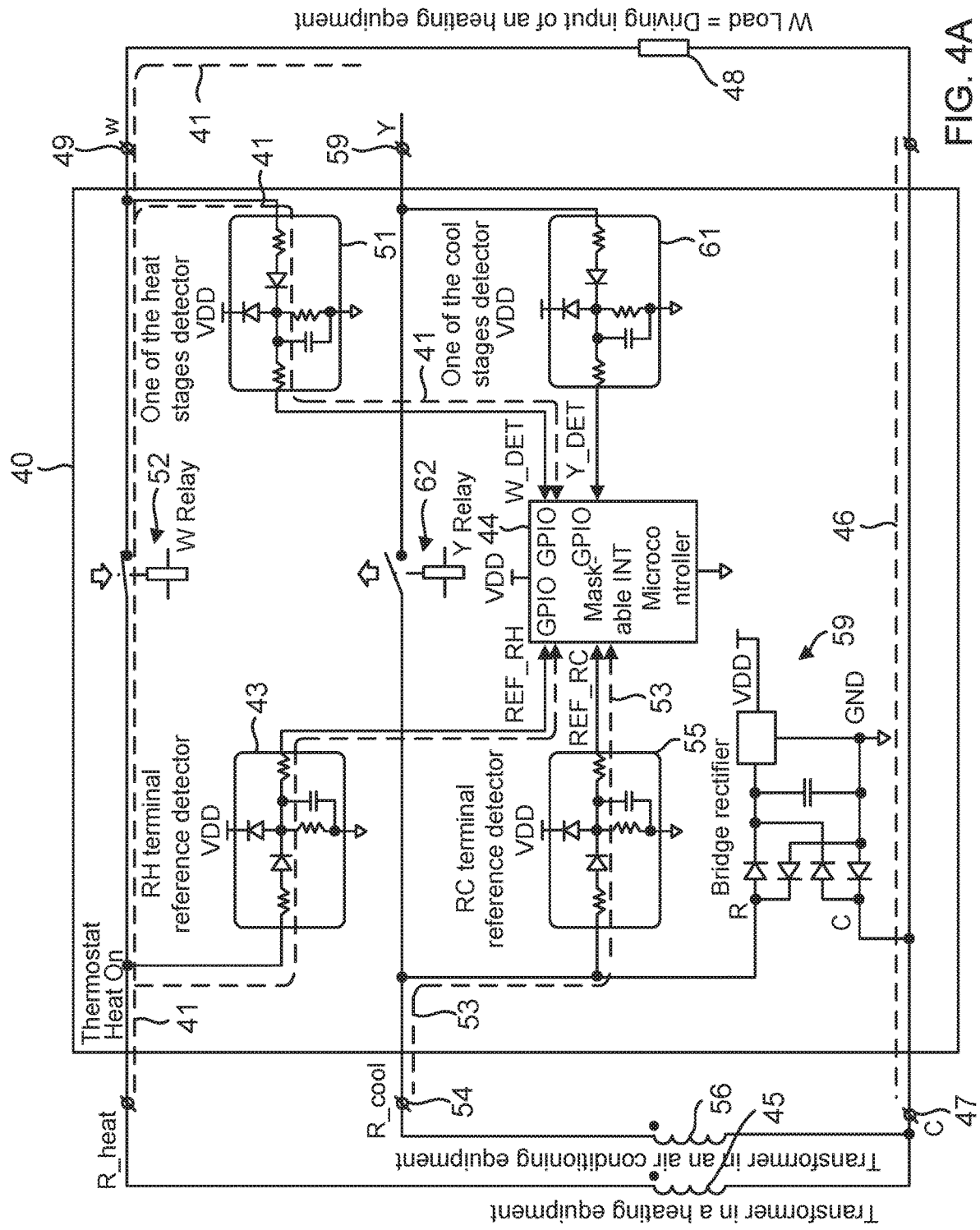
FIG. 4A is a diagram of circuitry associated with thermostat in a heat-on state but without a signal from terminal 47 going anywhere.

An alternative to the circuitry in FIG. 4A may be the switch 52 being opened and the switch 62 being closed. This may result in thermostat 40 to be in a cool on state. Switches 52 and 62 may be relay, mechanical, or solid-state operated.

Figure 4B:
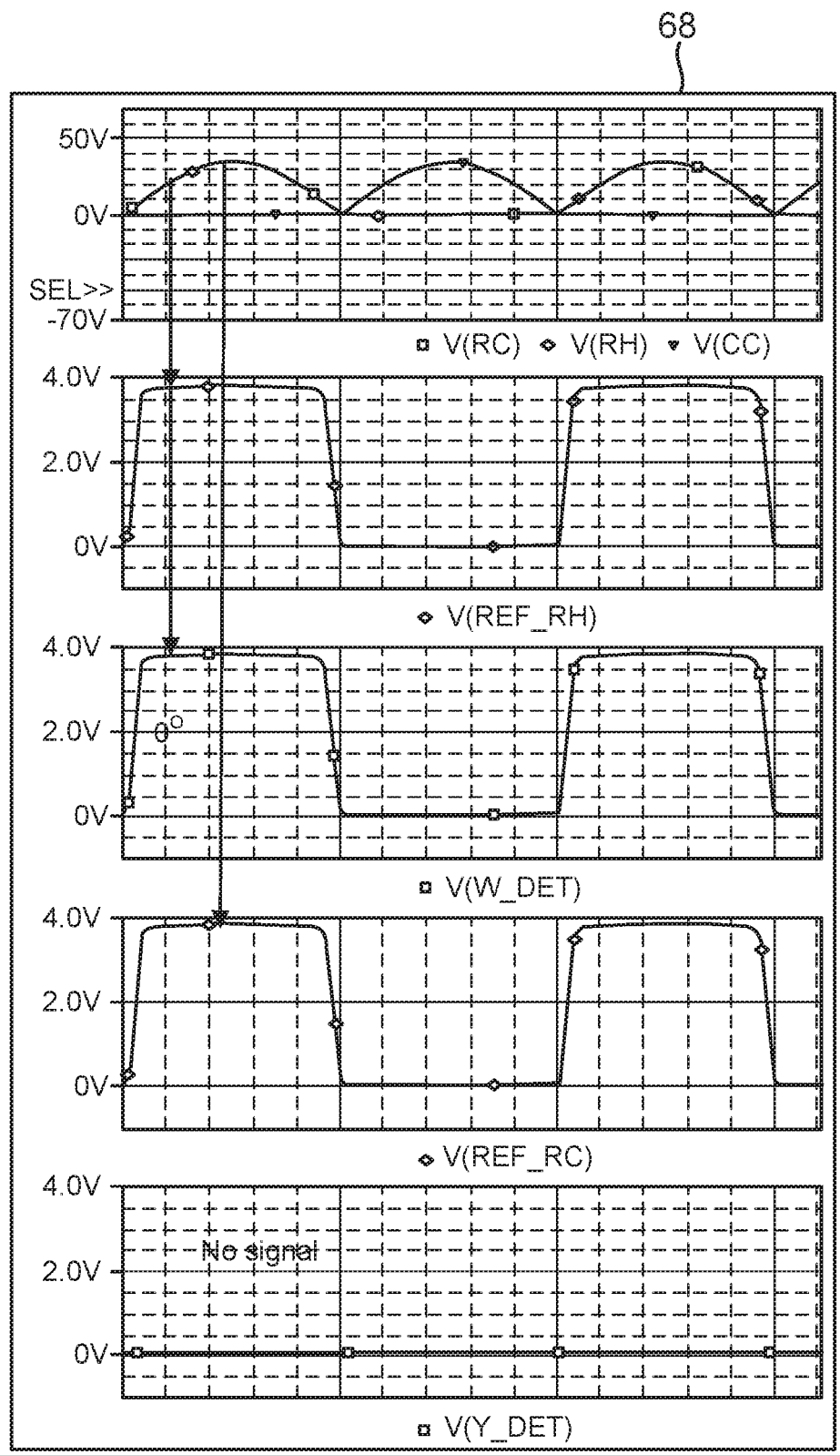
FIG. 4B is a diagram of waveforms corresponding to the circuit of FIG. 4A.

FIG. 4A is a diagram of circuitry associated with thermostat 40 in a heat-on state but without a signal 46 from terminal 47 (C) going anywhere. Y load 58 (i.e., the driving input of air conditioning equipment) is not depicted in the circuitry of FIG. 5A. FIG. 4B is a diagram 68 of waveforms corresponding to the circuit of FIG. 4A.

Figure 5A:
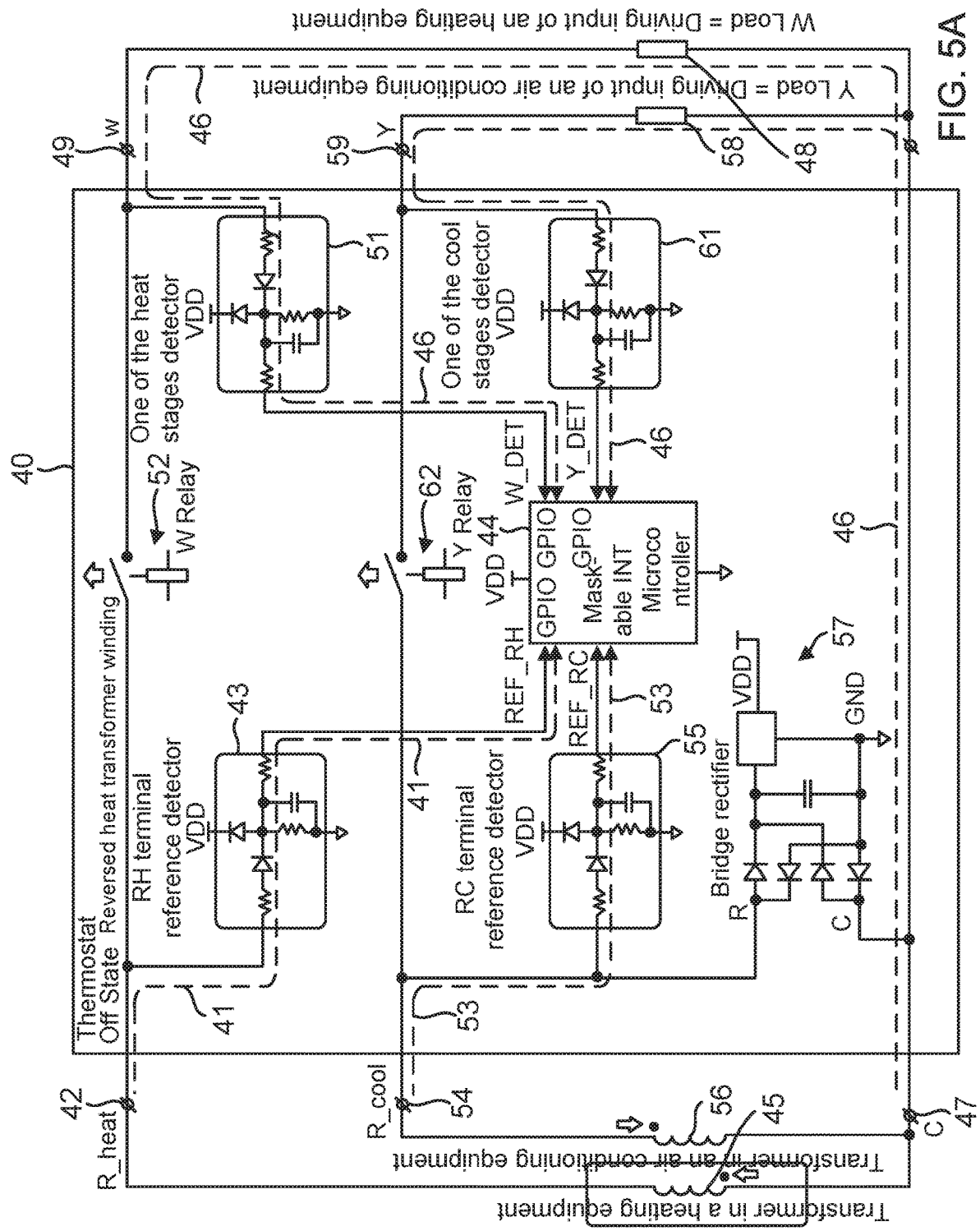
FIG. 5A is a diagram of circuitry associated with thermostat in an off state with a reversed heat transformer winding.
Figure 5B:
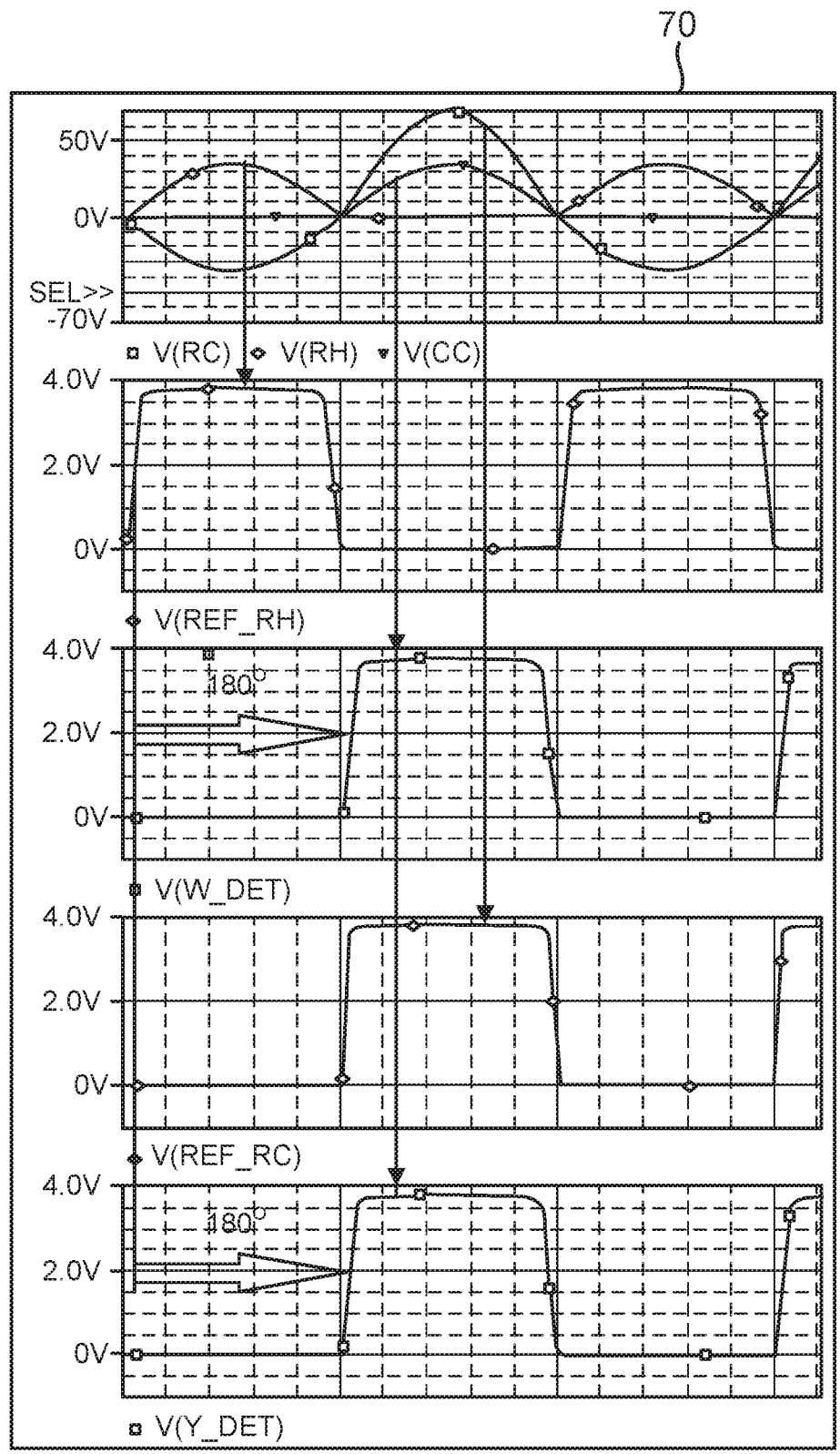
FIG. 5B is a diagram of waveforms corresponding to the circuit of FIG. 5A.

FIG. 5A is a diagram of circuitry associated with thermostat 40 in an off state with a reversed heat transformer 45 winding. This circuitry, except for the reversed transformer winding, is similar to the circuitry in the diagram of FIG. 2A. FIG. 5B is a diagram 70 of waveforms corresponding to the circuit of FIG. 5A.

Figure 6:
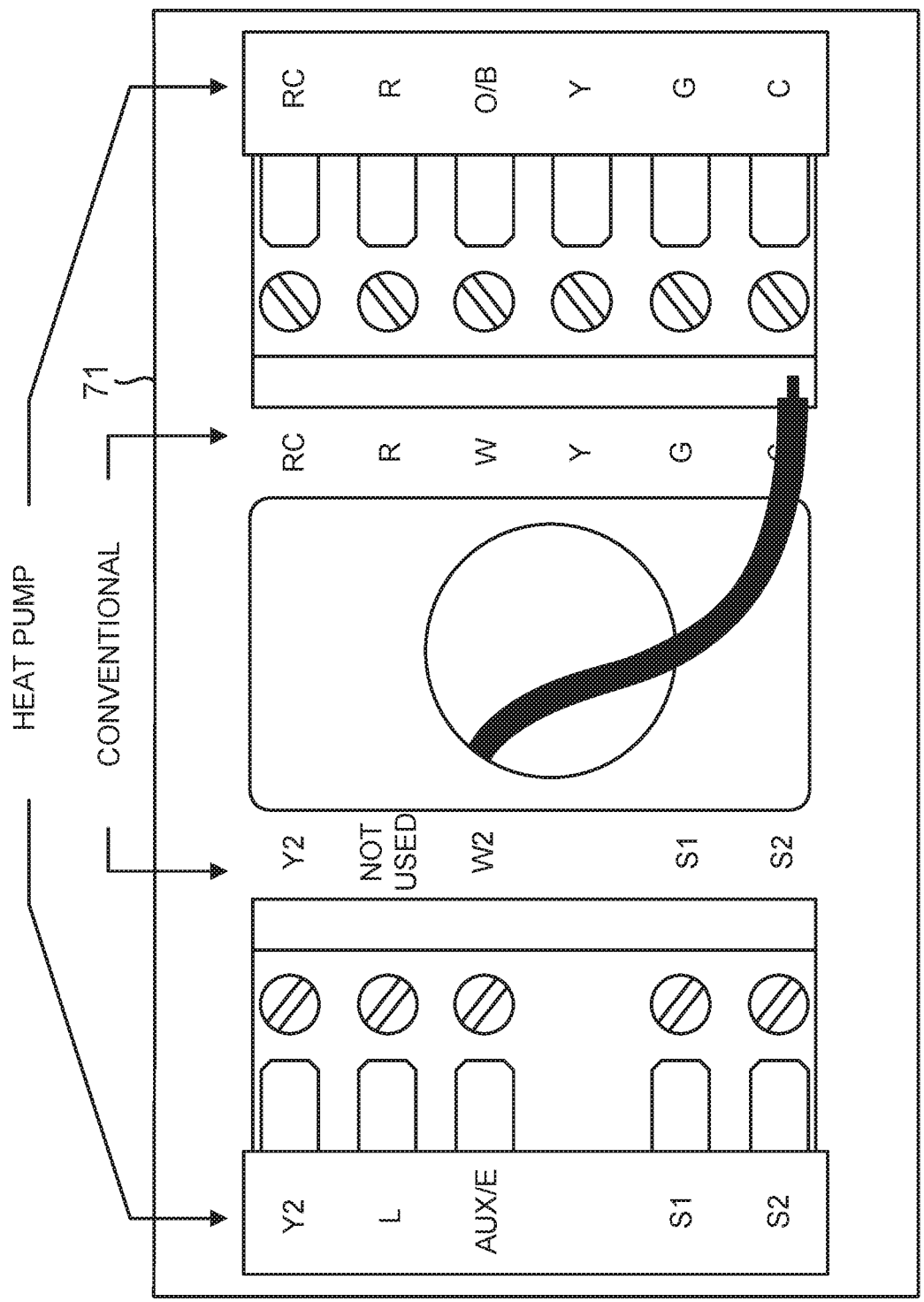
FIG. 6 is a diagram of nomenclature for a conventional thermostat, and that for a thermostat of a heat pump.

FIG. 6 is a diagram of nomenclature for a conventional thermostat 71, and that for a thermostat 71 of a heat pump. There may be variations of nomenclature among thermostats by different manufacturers. There may also be variations of colors for wires used to connect the thermostats. "G" may be green for a fan; "R" may be red for 24 VAC; "Y" may be yellow for a compressor or air conditioner; "W" may be white for heating; "C" may be blue or another color for a common for 24 VAC; "AUX/E" may be for auxiliary heat strips; "S" may be for a service light; "O/B" may be for a heat pump. A "2" after a letter may refer to auxiliary (e.g., aux) equipment or second stage activity.

FIG. 7A is a table 75 of check-offs for a thermostat having a single transformer configuration (or a dual in phase transformer configuration). The table may ask questions about a wired load, energized load, detected pulses phase and interpretation. These questions may be asked for after power up, off state and for a later (e.g., call for heat). The terminals to loads observed may be RC, RH, Y, Y2, G, W-O/B, W2 AUX and E.

FIG. 7B is a table 76 similar to the table of FIG. 8A except that the check-offs may be for a dual transformer configuration heat transformer with a reversed winding orientation. A "*" indication in table 76 may imply that if one of the transformers has reversed winding orientation, a detected phase is the same not only in an off state but also in an energized state (for loads powered from RH).

FIG. 7C is a table 77 asking questions like those for tables 75 and 76, but only for after power up, off state, for a dual transformer configuration, where an R wire from a transformer is accidently miss-wired to a W-O/B terminal.

In some cases, the tables 75, 76, 77 may be depicted on a user interface of a thermostat, a user interface of a thermostat installation tool, and/or a user interface of one or more other suitable electronic components.

The disclosure contemplates computer-readable storage media comprising instructions to cause a processor to perform any of the functions and techniques described herein. The computer-readable storage media may take the example form of any volatile, non-volatile, magnetic, optical, or electrical media, such as a RAM, ROM, NVRAM, EEPROM, or flash memory. The computer-readable storage media may be referred to as non-transitory. A computing device may also contain a more portable removable memory type to enable easy data transfer or offline data analysis.

The techniques described in this disclosure, including those attributed to MCU 25, microcontroller 44, MCU 97, and various constituent components, may be implemented, at least in part, in hardware, software, firmware or any combination thereof. For example, various aspects of the techniques may be implemented within one or more processors, including one or more microprocessors, DSPs, ASICs, FPGAs, or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry.

As used herein, the term "circuitry" refers to an ASIC, an electronic circuit, a processor (shared, dedicated, or group) and memory that execute one or more software or firmware programs, a combinational logic circuit, or other suitable components that provide the described functionality. The term "processing circuitry" refers one or more processors distributed across one or more devices. For example, "processing circuitry" can include a single processor or multiple processors on a device. "Processing circuitry" can also include processors on multiple devices, wherein the operations described herein may be distributed across the processors and devices.

Such hardware, software, firmware may be implemented within the same device or within separate devices to support the various operations and functions described in this disclosure. For example, any of the techniques or processes described herein may be performed within one device or at least partially distributed amongst two or more devices. In addition, any of the described units, modules or components may be implemented together or separately as discrete but interoperable logic devices. Depiction of different features as modules or units is intended to highlight different functional aspects and does not necessarily imply that such modules or units must be realized by separate hardware or software components. Rather, functionality associated with one or more modules or units may be performed by separate hardware or software components, or integrated within common or separate hardware or software components.

The techniques described in this disclosure may also be embodied or encoded in an article of manufacture including a non-transitory computer-readable storage medium encoded with instructions. Instructions embedded or encoded in an article of manufacture including a non-transitory computer-readable storage medium encoded, may cause one or more programmable processors, or other processors, to implement one or more of the techniques described herein, such as when instructions included or encoded in the non-transitory computer-readable storage medium are executed by the one or more processors. Example non-transitory computer-readable storage media may include RAM, ROM, programmable ROM (PROM), EPROM, EEPROM, flash memory, a hard disk, a compact disc ROM (CD-ROM), a floppy disk, a cassette, magnetic media, optical media, or any other computer readable storage devices or tangible computer readable media.

In some examples, a computer-readable storage medium comprises non-transitory medium. The term "non-transitory" may indicate that the storage medium is not embodied in a carrier wave or a propagated signal. In certain examples, a non-transitory storage medium may store data that can, over time, change (e.g., in RANI or cache). Elements of devices and circuitry described herein, including, but not limited to, MCU 25, microcontroller 44, and MCU 97, may be programmed with various forms of software. The one or more processors may be implemented at least in part as, or include, one or more executable applications, application modules, libraries, classes, methods, objects, routines, subroutines, firmware, and/or embedded code, for example.

Various examples of the disclosure have been described. Any combination of the described systems, operations, or functions is contemplated. These and other examples are within the scope of the following claims.

Any publication or patent document noted herein is hereby incorporated by reference to the same extent as if each individual publication or patent document was specifically and individually indicated to be incorporated by reference.

In the present specification, some of the matter may be of a hypothetical or prophetic nature although stated in another manner or tense.

Although the present system and/or approach has been described with respect to at least one illustrative example, many variations and modifications will become apparent to those skilled in the art upon reading the specification. It is therefore the intention that the appended claims be interpreted as broadly as possible in view of the related art to include all such variations and modifications.

What is claimed is:

1. A system for detection of equipment connections to a thermostat, the system comprising:
    one or more processors implemented in circuitry;
    one or more terminals,
        wherein a respective terminal of the one or more terminals is configured to directly connect to a respective load, wherein the load comprises heating, ventilation, and air conditioning (HVAC) equipment, and
    one or more detectors,
        wherein each detector of the one or more detectors connects between a respective terminal of the one or more terminals and the one or more processors,
        wherein each detector of the one or more detectors is configured to provide a signal to the one or more processors relative to the respective terminal, and
    wherein the one or more processors is configured to determine whether the respective terminal of the one or more terminals connects to the respective load of the one or more loads based on receiving pulses from a respective detector connected to the respective terminal, wherein in response to no AC voltage being detected on the one or more terminals, the one or more processors is configured to determine that equipment is not connected,
    wherein the one or more processors is configured to receive a reference signal comprising an AC voltage,
    wherein a phase of the detected pulses is compared to a phase of the reference signal, wherein the comparison result determines whether the respective terminal of the one or more terminals connects to the respective load of the one or more loads,
    wherein the one or more processors is configured to output to a user interface a thermostat configuration based on determining whether the respective terminal connects to the respective load,
    wherein at least one detector is configured to connect to electrical power,
    wherein the at least one detector connected to electric power is configured to output pulses to the one or more processors,
    wherein the one or more processors is configured to determine when the respective load is in the OFF state based on comparing:
        a phase of the pulses from respective detector connected to the respective load, and
        a phase of the pulses from the at least one detector connected to electric power.

2. The system of claim 1, wherein the one or more processors is configured to determine that the respective terminal is disconnected from the respective load based on receiving no signal from the respective detector.

3. The system of claim 1, wherein:
    the one or more detectors associated with loads are connected to general purpose input/output interfaces of the one or more processors; and
    the at least one detector connected to the electric power connects to an input of the one or more processors with a maskable interrupt.

4. The system of claim 1, further comprising:
a full wave rectifier having a first input connected to the first end of the secondary winding of the transformer and a second input connected to the ground; and
a voltage regulator having an input connected to an output of the full wave rectifier and having an output configured to provide a DC voltage to the one or more detectors and to the one or more processors.

5. The system of claim 1, wherein a detector comprises:
a first resistor having a first end as an input;
a first diode having an anode connected to a second end of the first resistor;
a second resistor having a first end connected to a cathode of the first diode and having a second end as an output;
a third resistor having a first end connected to the first end of the second resistor and having a second end connected to the ground;
a second diode having an anode connected to the cathode of first diode and having a cathode connected to an output of the rectifier; and
a capacitor having a first end connected to the first end of the third resistor and having a second end connected to ground.

6. The system of claim 1, wherein the one or more terminals comprises: connections R and RC connected to the first end of the secondary winding of the transformer;
connections C and CC configured for a common connection to the ground; a connection W-OB and L configured for a heat pump;
a connection W configured for heat;
a connection W2 configured for an auxiliary furnace; a connection E configured for auxiliary heat strips;
a connection Y configured for cooling;
a connection Y2 configured for second stage cooling; or
a connection F or G configured for a fan.

7. The system of claim 6, wherein the thermostat further comprises a Zener diode connected between an input of a detector of the one or more detectors and a load of the one or more loads connected to the L line for providing a heat pump alert.

8. The system of claim 1, wherein the one or more loads comprises one or more of a heater, a cooler, a compressor, a heat pump, a humidifier, a fan, a furnace, a heat strip, a valve, an air conditioner, and a dehumidifier.

9. A system comprising:
a thermostat comprising N connections configured to connect to at least one of:
electrical power; and
a load comprising heating, ventilation, and air conditioning (HVAC) equipment;
one or more processors implemented in circuitry; and
one or more detectors comprising:
an input; and
an output configured to connect to a respective input of the one or more processors,
wherein:
each respective connection of the N connections is configured to connect to a respective input of a respective detector of the one or more detectors;
the one or more processors is configured to:
receive a reference signal comprising an AC voltage;
determine whether the respective connection of the N connections is connected to a respective load or not connected, based on the one or more processors determining that a respective signal from a respective detector with the respective input connected to the load comprises pulses, wherein a phase of the pulses is compared to a phase of the reference signal, wherein the comparison result determines whether the respective connection of the N connections is connected to a respective load, wherein in response to no AC voltage being detected, the one or more processors is configured to determine that equipment is not connected; and
output to a user interface a thermostat configuration based on determining whether the respective terminal connects to the respective load;
wherein the one or more processors are configured to compare a phase of:
a first signal comprising the respective signal from the respective detector with the input connected to a load; and
a second signal comprising the respective signal from the respective detector with an input connected to the electrical power.

10. The system of claim 9, further comprising a general purpose input/output circuit at each input of the one or more processors corresponding to and connected to each respective detector output.

11. The system of claim 9, wherein, over a predetermined period of time, each detector and the one or more processors are configured to determine whether the corresponding connection of the respective detector has an unreliable or failing connection with the respective load.

12. The system of claim 9, wherein:
in response to determining, based on the comparison, the first signal and the second signal are out of phase, the processer is configured to determine the first end of the load to the first end of the secondary winding of the transformer or the second end of the load to the ground is lacking in connection or the first end of the load to the input of the second detector is lacking in connection; and
in response to determining, based on the comparison, the first signal and the second signal are in phase, the processer is configured to determine the first end of the load to the first end of the secondary winding of the transformer is in connection, the second end of the load to the ground is in connection, and the first end of the load to the input of the second detector is in connection.

13. A system for detection of equipment connections to a thermostat, comprising:
one or more processors implemented in circuitry;
one or more terminals,
wherein a first terminal of the one or more terminals is configured to directly connect to the equipment, and
wherein a second terminal of the one or more terminals is configured to directly connect to electrical power; and
a first detector connected to the first terminal and a second detector connected to the second terminal,
wherein each detector is configured to provide a signal to the one or more processors relative to the corresponding terminal indicating a status of a connection of the corresponding terminal, and
wherein the one or more processors is configured to:
determine whether the first terminal connects to a load based on receiving pulses from the first detector,
determine whether the equipment is in an OFF state, wherein a phase of the pulses determines whether the first terminal connects to the load based on whether pulses from the first detector are in phase with pulses from the second detector, wherein in response to no AC voltage being detected on the one or more terminals, the one or more processors is configured to determine that equipment is not connected, and output to a user interface a thermostat configuration based on determining whether the first terminal connects to the load.

14. The system of claim 13, wherein:

at least one terminal of the one or more terminals is connected to a first end of a secondary winding of a transformer; and the equipment having a connection to a terminal of the one or more terminals has another connection to a second end of the secondary winding of the transformer.

15. The system of claim 14, wherein the second end of the secondary winding of the transformer is connected to a ground.

16. The system of claim 13, wherein:

the first detector connects to a general purpose input/output interface of the one or more processors; and the second detector connects to the one or more processors at an interface with a maskable interrupt.

17. The system of claim 15, further comprising:

a full wave rectifier having a first input connected to the first end of the secondary winding of the transformer and a second input connected to the ground; and a voltage regulator having an input connected to an output of the full wave rectifier and having an output configured to provide a DC voltage to the first detector, the second detector, and to the one or more processors.

18. The system of claim 15, wherein the first detector and the second detector comprise:

a first resistor having a first end as an input;

a first diode having an anode connected to a second end of the first resistor;

a second resistor having a first end connected to a cathode of the first diode and having a second end as an output;

a third resistor having a first end connected to the first end of the second resistor and having a second end connected to the ground;

a second diode having an anode connected to the cathode of first diode and having a cathode connected to an output of the rectifier; and a capacitor having a first end connected to the first end of the third resistor and having a second end connected to ground.

\* \* \* \* \*